United States Patent
Luo et al.

(10) Patent No.: US 11,856,603 B2
(45) Date of Patent: Dec. 26, 2023

(54) SHARING CHANNEL OCCUPANCY TIME ACROSS NODES OF AN INTEGRATED ACCESS BACKHAUL NETWORK

(71) Applicant: QUALCOMM Incorporated, San Diego, CA (US)

(72) Inventors: Jianghong Luo, Skillman, NJ (US); Xiaoxia Zhang, San Diego, CA (US); Jing Sun, San Diego, CA (US); Navid Abedini, Somerset, NJ (US); Tao Luo, San Diego, CA (US); Luca Blessent, Whitehouse Station, NJ (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 106 days.

(21) Appl. No.: 17/081,880

(22) Filed: Oct. 27, 2020

(65) Prior Publication Data

US 2021/0378011 A1   Dec. 2, 2021

Related U.S. Application Data

(60) Provisional application No. 63/030,194, filed on May 26, 2020.

(51) Int. Cl.
*H04W 74/08* (2009.01)
*H04W 88/14* (2009.01)
(Continued)

(52) U.S. Cl.
CPC ......... *H04W 74/0816* (2013.01); *H04L 45/20* (2013.01); *H04W 72/23* (2023.01); *H04W 76/15* (2018.02); *H04W 88/14* (2013.01)

(58) Field of Classification Search
CPC ......... H04W 74/0816; H04W 74/0833; H04W 74/0808; H04W 74/004; H04W 74/006;
(Continued)

(56) References Cited

U.S. PATENT DOCUMENTS

2020/0053798 A1* 2/2020 Tsai .................... H04W 74/006
2020/0145967 A1* 5/2020 Park .................. H04W 72/0426
(Continued)

FOREIGN PATENT DOCUMENTS

| CN | WO2020156180 | * | 8/2020 |
| JP | 3955620 A1 | * | 2/2022 |
| WO | WO2020146833 | * | 7/2020 |

OTHER PUBLICATIONS

"3rd Generation Partnership Project, Technical Specification Group Radio Access Network, Physical Layer Procedures for Shared Spectrum Channel Access (Release 16)", 3GPP Standard, Technical Specification, 3GPP TS 37.213, 3rd Generation Partnership Project (3GPP), Mobile Competence Centre 650, Route Des Lucioles, F-06921 Sophia-Antipolis Cedex, France, vol. RAN WG1, No. V16.1.0 Apr. 3, 2020 (Apr. 4, 2020), XP051893817, pp. 1-25, Retrieved from the Internet: URL:ftp://ftp.3gpp.org/Specs/archive/37_series/37.213/37213-g10.zip 37213-g10.doc.
(Continued)

*Primary Examiner* — Sudesh M Patidar
(74) *Attorney, Agent, or Firm* — QUALCOMM Incorporated

(57) ABSTRACT

Wireless communications systems and methods related to sharing channel occupancy time (COT) for a channel in an unlicensed 5G spectrum in an integrated access backhaul (IAB) network are provided. In some aspects, an IAB node of the IAB network may perform a channel access procedure to acquire the COT and share the COT with a parent IAB node and/or a child IAB node for the parent IAB node and/or
(Continued)

1300

```
┌─────────────────────────────────────────────────────────┐
│ Receive, from a second IAB node and for signal          │
│ transmission by the first IAB node, a first             │──1310
│ communication signal allowing the first IAB node to     │
│ access a channel in an unlicensed 5G spectrum during    │
│ a channel occupancy time (COT)                          │
└─────────────────────────────────────────────────────────┘
                            │
                            ▼
┌─────────────────────────────────────────────────────────┐
│ Communicate a second communication signal with a third  │
│ IAB node different from the first IAB node to allow the │──1320
│ third IAB node to access the channel for signal         │
│ transmission by the third IAB node during the COT       │
└─────────────────────────────────────────────────────────┘
``` child IAB node to share, or use the COT for communication, with a third IAB node different from the COT-initiating IAB node.

26 Claims, 18 Drawing Sheets

(51) Int. Cl.
*H04W 76/15* (2018.01)
*H04L 45/00* (2022.01)
*H04W 72/23* (2023.01)

(58) Field of Classification Search
CPC . H04W 74/008; H04W 74/002; H04W 74/08; H04W 76/15; H04W 72/042; H04W 72/1278; H04W 72/0426; H04W 72/0413; H04W 72/0406; H04W 72/12; H04W 72/14; H04W 88/14; H04W 16/14; H04L 45/20
See application file for complete search history.

(56) References Cited

U.S. PATENT DOCUMENTS

| | | | | |
|---|---|---|---|---|
| 2020/0322982 | A1* | 10/2020 | Wu | H04W 48/16 |
| 2021/0007149 | A1* | 1/2021 | Li | H04W 74/0833 |
| 2021/0050933 | A1* | 2/2021 | Myung | H04L 5/0055 |
| 2021/0068154 | A1* | 3/2021 | Jia | H04W 74/0816 |
| 2021/0136676 | A1* | 5/2021 | Muller | H04B 7/2606 |
| 2021/0204322 | A1* | 7/2021 | Lou | H04W 74/0816 |
| 2022/0015143 | A1* | 1/2022 | Tiirola | H04W 74/0808 |
| 2022/0078781 | A1* | 3/2022 | Zhou | H04W 16/14 |
| 2022/0167423 | A1* | 5/2022 | Aldana | H04W 74/004 |
| 2022/0232392 | A1* | 7/2022 | Xu | H04W 72/23 |

OTHER PUBLICATIONS

ANONYMOUS: "3rd Generation Partnership Project, Technical Specification Group Radio Access Network, NR, Study on Integrated Access and Backhaul, (Release 16)", 3GPP Standard Technical Report, 3GPP, TR 38.874, 3rd Generation Partnership Project (3GPP), Mobile Competence Centre, 650, Route Des Lucioles, F-06921 Sophia-Antipolis Cedex, France, No. V16.0.0, Jan. 10, 2019 (Jan. 18, 2019), Dec. 31, 2018 (Dec. 31, 2018), pp. 1-111, XP051591643, Sections 8.3.5 and 9.3, p. 21-p. 23.

International Search Report and Written Opinion—PCT/US2021/029196—ISA/EPO—Jul. 15, 2021.

\* cited by examiner

Table 4.1.1-1: Channel Access Priority Class

| Channel Access Priority Class (p) | $m_p$ | $CW_{min,p}$ | $CW_{max,p}$ | $T_{mcot,p}$ | allowed $CW_p$ sizes |
|---|---|---|---|---|---|
| 1 | 1 | 3 | 7 | 2 ms | {3,7} |
| 2 | 1 | 7 | 15 | 3 ms | {7,15} |
| 3 | 3 | 15 | 63 | 8 or 10 ms | {15,31,63} |
| 4 | 7 | 15 | 1023 | 8 or 10 ms | {15,31,63,127,255,511,1023} |

FIG. 7B

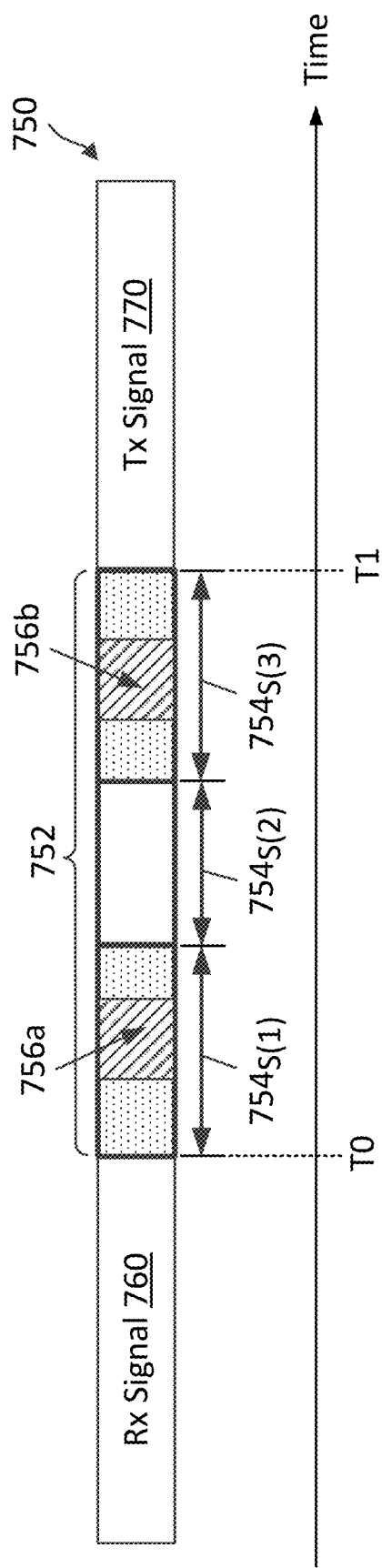

SHARING CHANNEL OCCUPANCY TIME ACROSS NODES OF AN INTEGRATED ACCESS BACKHAUL NETWORK

CROSS REFERENCE TO RELATED APPLICATIONS

The present application claims priority to and the benefit of the U.S. Provisional Patent Application No. 63/030,194, filed May 26, 2020, titled "Sharing Channel Occupancy Time Across Nodes of an Integrated Access Backhaul Network," which is hereby incorporated by reference in its entirety as if fully set forth below and for all applicable purposes.

TECHNICAL FIELD

This application generally relates to wireless communication systems, and more particularly to methods and systems configured to facilitate the sharing of channel occupancy time (COT) for a channel in an unlicensed 5G spectrum across nodes of an integrated access backhaul (IAB) network.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system). A wireless multiple-access communications system may include a number of base stations (BSs), each simultaneously supporting communication for multiple communication devices, which may be otherwise known as user equipment (UE).

To meet the growing demands for expanded mobile broadband connectivity, wireless communication technologies are advancing from the LTE technology to a fifth generation (5G) new radio (NR) technology. 5G NR may provision for access traffic and backhaul traffic at gigabit-level throughput. Access traffic refers to traffic between an access node (e.g., a base station) and a UE. Backhaul traffic refers to traffic among access nodes and a core network.

BRIEF SUMMARY OF SOME EXAMPLES

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

Wireless communications systems and methods related to sharing channel occupancy time (COT) for a channel in an unlicensed 5G spectrum across nodes of an integrated access backhaul (IAB) network are provided. In some aspects, an IAB node of the IAB network may perform a channel access procedure to acquire or initiate the COT and share the COT with a parent IAB node and/or a child IAB node for the parent IAB node and/or child IAB node to use the COT for communication with, or in turn share the COT (or what remains thereof) with, another IAB node that is different from the COT-initiating node. As such, by allowing the COT to be used across IAB nodes instead of going unused (at least partially), the sharing of a COT with IAB nodes that are not directly linked to a COT-initiating IAB node can promote the efficient use of IAB network resources.

In an aspect of the present disclosure, a method of wireless communication performed by a first integrated access backhaul (IAB) node is disclosed. The method comprises receiving, from a second IAB node and for signal transmission by the first IAB node, a first communication signal allowing the first IAB node to access a channel in an unlicensed 5G spectrum during a channel occupancy time (COT). In such cases, the COT can be acquired by the second IAB node. The method further comprises communicating a second communication signal with a third IAB node different from the first IAB node to allow the third IAB node to access the channel for signal transmission by the third IAB node during the COT.

An additional aspect of the present disclosure discloses an apparatus comprising a transceiver configured to receive, from a second IAB node and for signal transmission by the first IAB node, a first communication signal allowing the first IAB node to access a channel in an unlicensed 5G spectrum during a channel occupancy time (COT), the COT acquired by the second IAB node. The transceiver is further configured to communicate a second communication signal with a third IAB node different from the first IAB node to allow the third IAB node to access the channel for signal transmission by the third IAB node during the COT.

In an additional aspect of the present disclosure, a non-transitory computer-readable medium (CRM) having program code recorded thereon is disclosed. The program code comprises code for causing a first integrated access backhaul (IAB) node to receive, from a second IAB node and for signal transmission by the first IAB node, a first communication signal allowing the first IAB node to access a channel in an unlicensed 5G spectrum during a channel occupancy time (COT), the COT acquired by the second IAB node. The program code comprises code for causing the first IAB node communicate a second communication signal with a third IAB node different from the first IAB node to allow the third IAB node to access the channel for signal transmission by the third IAB node during the COT.

An additional aspect of the present disclosure discloses an apparatus comprising means for receiving, from a second IAB node and for signal transmission by the first IAB node, a first communication signal allowing the first IAB node to access a channel in an unlicensed 5G spectrum during a channel occupancy time (COT), the COT acquired by the second IAB node. The apparatus further comprises means for communicating a second communication signal with a third IAB node different from the first IAB node to allow the third IAB node to access the channel for signal transmission by the third IAB node during the COT.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

BRIEF DESCRIPTION OF THE DRAWINGS

FIGS. 7A-7E illustrate channel access procedures for unlicensed new radio (NR) spectrum according to aspects of the present disclosure.

DETAILED DESCRIPTION

Figure 1:
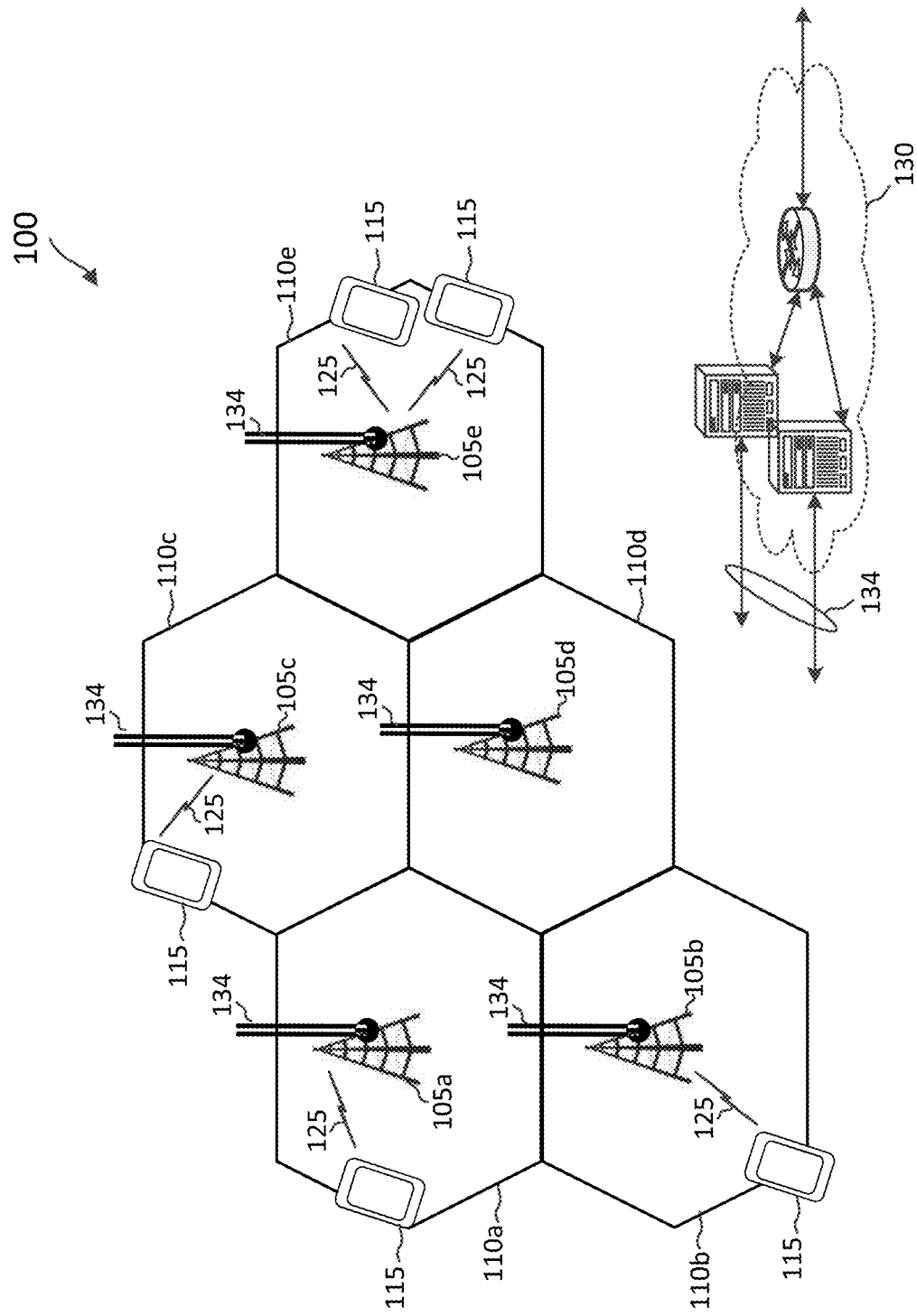
FIG. 1 illustrates a wireless communication network according to aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form to avoid obscuring such concepts.

This disclosure relates generally to wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, Global System for Mobile Communications (GSM) networks, $5^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the UMTS mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with an Ultra-high density (e.g., ~1 M nodes/km), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing (SCS), may efficiently address operating diverse services across diverse spectrum and diverse deployments. For example, in various outdoor and macro coverage deployments of less than 3 GHz FDD/TDD implementations, SCS may occur with 15 kHz, for example over 5, 10, 20 MHz, and the like bandwidth (BW). For other various outdoor and small cell coverage deployments of TDD greater than 3 GHz, SCS may occur with 30 kHz over 80/100 MHz BW. For other various indoor wideband implementations, using a TDD over the unlicensed portion of the 5 GHz band, the SCS may occur with 60 kHz over a 160 MHz BW. Finally, for various deployments transmitting with mmWave components at a TDD of 28 GHz, the SCS may occur with 120 kHz over a 500 MHz BW.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink (UL)/downlink (DL) scheduling information, data, and acknowledgement in the same subframe. The self-contained integrated subframe supports communications in unlicensed or contention-based shared spectrum, adaptive UL/downlink that may be flexibly configured on a per-cell basis to dynamically switch between UL and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects or examples set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may include at least one element of a claim.

The present application describes mechanisms for the sharing of COT across IAB nodes of an IAB network. The sharing may occur with IAB nodes that are positioned along a downstream signal path away from an IAB donor of the IAB network or upstream towards the IAB donor, and these IAB nodes may not be directly linked to the COT-initiating node. The sharing may also occur with UEs that are positioned along a downstream signal path away from the IAB donor of the IAB network, and may be more than one access link away from the COT-initiating node. In other words, the COT-receiving IAB nodes or UEs may be more than one backhaul link or access link, respectively, away from the COT-initiating IAB node. Aspects of the technology discussed herein can provide several benefits. For example, COT-sharing across IAB nodes of an IAB network improves the efficient use of IAB network resources. This is because a COT acquired by a first IAB node (but not used entirely by the first IAB node for a DL or UL transmission) can be shared by the first IAB node with its parent IAB node or child IAB node, and the parent IAB node or child IAB node may use the COT for communication with, or in turn share the remaining COT with, additional IAB nodes that are different from the COT-initiating IAB node, thereby allowing the complete or nearly complete use of the COT. Further, COT-sharing across IAB nodes of an IAB network allows the IAB network to have low latency, as the IAB nodes can use already acquired COT for communication with other IAB nodes after performing a type2 channel access procedure rather than performing a type1 channel access procedure, wherein normally a type2 procedure is much simpler and quicker procedure for evaluating the idleness of channel for next transmission. In some aspects, a channel access procedure can refer to a procedure based on sensing that evaluates the availability of a channel for performing transmissions, as discussed in the 3GPP standard document technical specification "3GPP TS 37.213 (Release 16)", which is incorporated herein by reference in its entirety. In addition, the COT-sharing may improve the capabilities of IAB networks to provide extremely high data rates to network users.

FIG. 1 illustrates a wireless communication network 100 according to aspects of the present disclosure. The network 100 includes a plurality of BSs 105, a plurality of UEs 115, and a core network 130. The network 100 may be a LTE network, a LTE-A network, a millimeter wave (mmW) network, a new radio (NR) network, a 5G network, or any other successor network to LTE.

The BSs 105 may wirelessly communicate with the UEs 115 via one or more BS antennas. Each BS 105 may provide communication coverage for a respective geographic coverage area 110. In 3GPP, the term "cell" can refer to this particular geographic coverage area of a BS and/or a BS subsystem serving the coverage area, depending on the context in which the term is used. In the example shown in FIG. 1, the BSs 105a, 105b, 105c, 105d, and 105e are examples of macro BSs for the coverage areas 110a, 110b, 110c, 110d, and 110e, respectively.

Communication links 125 shown in the network 100 may include uplink (UL) transmissions from a UE 115 to a BS 105, or downlink (DL) transmissions, from a BS 105 to a UE 115. The communication links 125 are referred to as wireless access links. The UEs 115 may be dispersed throughout the network 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of things (IoT) device, an Internet of Everything (IoE) device, a machine type communication (MTC) device, an appliance, an automobile, or the like.

The BSs 105 may communicate with the core network 130 and with one another via optical fiber links 134. The core network 130 may provide user authentication, access authorization, tracking, Internet Protocol (IP) connectivity, and other access, routing, or mobility functions. At least some of the BSs 105 (e.g., which may be an example of an evolved NodeB (eNB), a next generation NodeB (gNB), or an access node controller (ANC)) may interface with the core network 130 through the backhaul links 134 (e.g., S1, S2, etc.) and may perform radio configuration and scheduling for communication with the UEs 115. In various examples, the BSs 105 may communicate, either directly or indirectly (e.g., through core network 130), with each other over the backhaul links 134 (e.g., X1, X2, etc.).

Each BS 105 may also communicate with a number of UEs 115 through a number of other BSs 105, where the BS 105 may be an example of a smart radio head. In alternative configurations, various functions of each BS 105 may be distributed across various BSs 105 (e.g., radio heads and access network controllers) or consolidated into a single BS 105.

In some implementations, the network 100 utilizes orthogonal frequency division multiplexing (OFDM) on the downlink and single-carrier frequency division multiplexing (SC-FDM) on the UL. OFDM and SC-FDM partition the system bandwidth into multiple (K) orthogonal subcarriers, which are also commonly referred to as tones, bins, or the like. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. The system bandwidth may also be partitioned into subbands.

In an aspect, the BSs 105 can assign or schedule transmission resources (e.g., in the form of time-frequency resource blocks) for DL and UL transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes, for example, about 10. Each subframe can be divided into slots, for example, about 2. In a frequency-division duplexing (FDD) mode, simultaneous UL and DL transmissions may occur in different frequency bands. For example, each subframe includes a UL subframe in a UL frequency band and a DL subframe in a DL frequency band. In a time-division duplexing (TDD) mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational bandwidth or frequency band, each positioned at a pre-defined time and a pre-defined frequency. For example, a BS 105 may transmit cell-specific reference signals (CRSs) and/or channel state information-reference signals (CSI-RSs) to enable a UE 115 to estimate a DL channel. Similarly, a UE 115 may transmit sounding reference signals (SRSs) to enable a BS 105 to estimate a UL channel. Control information may include resource assignments and protocol controls. Data may include protocol data and/or operational data. In some aspects, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication. A UL-centric subframe may include a longer duration for UL communication.

In an aspect, a UE 115 attempting to access the network 100 may perform an initial cell search by detecting a primary synchronization signal (PSS) from a BS 105. The PSS may enable synchronization of period timing and may indicate a physical layer identity value. The UE 115 may then receive a secondary synchronization signal (SSS). The SSS may enable radio frame synchronization, and may provide a cell identity value, which may be combined with the physical layer identity value to identify the cell. The SSS may also enable detection of a duplexing mode and a cyclic prefix length. Some systems, such as TDD systems, may transmit an SSS but not a PSS. Both the PSS and the SSS may be located in a central portion of a carrier, respectively. After receiving the PSS and SSS, the UE 115 may receive a master information block (MIB), which may be transmitted in the physical broadcast channel (PBCH). The MIB may contain system bandwidth information, a system frame number (SFN), and a Physical Hybrid-ARQ Indicator Channel (PHICH) configuration. After decoding the MIB, the UE 115 may receive one or more system information blocks (SIBs). For example, SIB1 may contain cell access parameters and scheduling information for other SIBs. Decoding SIB1 may enable the UE 115 to receive SIB2. SIB2 may contain radio resource configuration (RRC) configuration information related to random access channel (RACH) procedures, paging, physical uplink control channel (PUCCH), physical uplink shared channel (PUSCH), power control, SRS, and cell barring. After obtaining the MIB and/or the SIBS, the UE 115 can perform random access procedures to establish a connection with the BS 105. After establishing the connection, the UE 115 and the BS 105 can enter a normal operation stage, where operational data may be exchanged.

Figure 2:
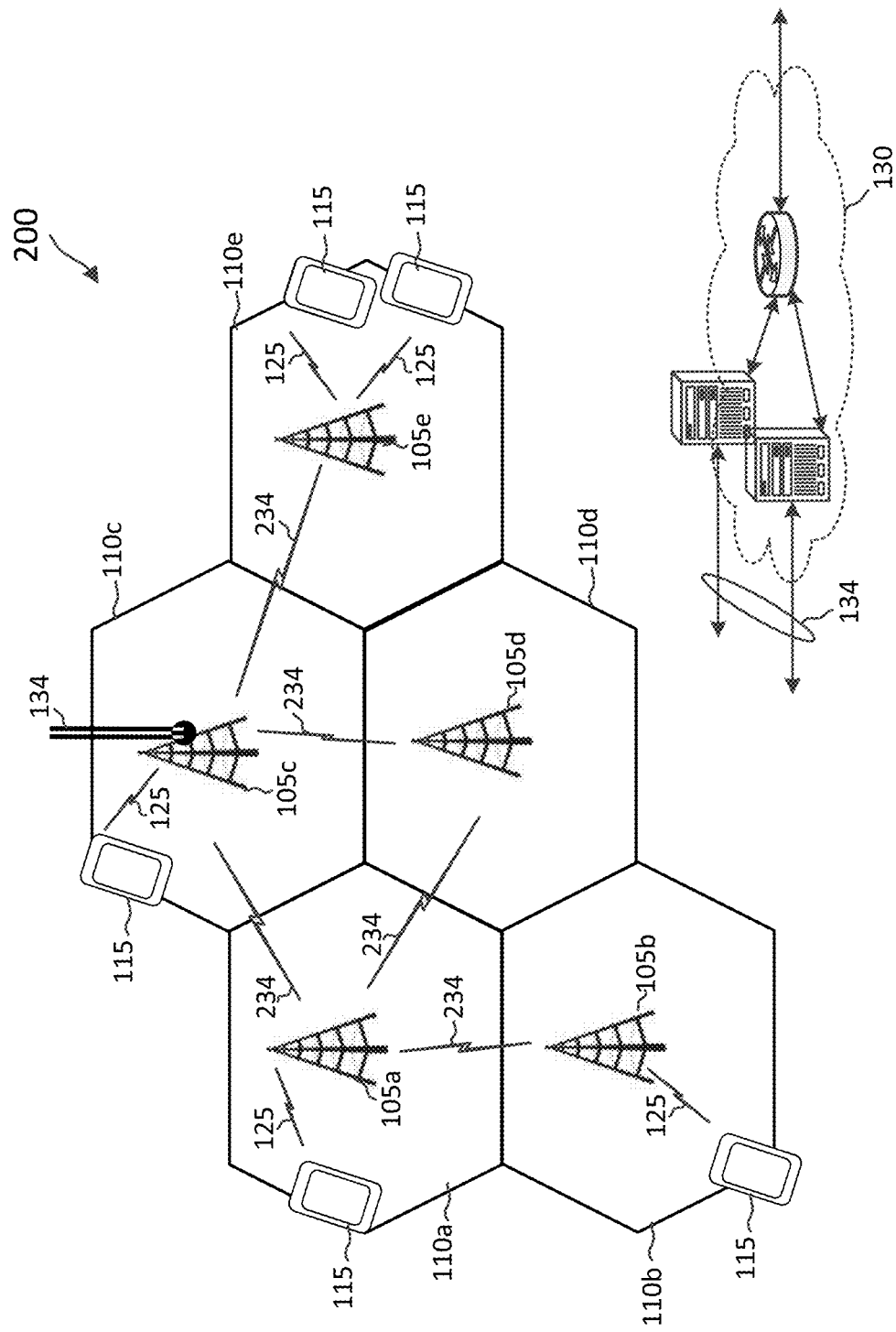
FIG. 2 illustrates an integrated access backhaul (IAB) network according to aspects of the present disclosure.

FIG. 2 illustrates an IAB network 200 according to aspects of the present disclosure. The network 200 is substantially similar to the network 100. For example, the BSs 105 communicates with the UEs 115 over the wireless access links 125. However, in the network 200, only one BS (e.g., the BS 105*c*) is connected to an optical fiber backhaul link 134. The other BSs 105*a*, 105*b*, 105*d*, and 105*e* wirelessly communicate with each other and with the BS 105*c* over wireless backhaul links 234. In the present disclosure, the term IAB donor may also be used to refer to BS 105*c* and the term IAB node (of the IAB network 200) to any of the other BSs (e.g., BSs 105*a*, 105*b*, 105*d*, and 105*e*). The BS 105*c* connected to the optical fiber backhaul link 134 may function as an anchor for the other BSs 105*a*, 105*b*, 105*d*, and 105*e* to communicate the core network 130, as described in greater detail herein. The wireless access links 125 and the wireless backhaul links 234 may share resources for communications in the network 200. The network 200 may also be referred to as a self-backhauling network. The network 200 can improve wireless link capacity, reduce latency, and reduce deployment cost.

Figure 3:
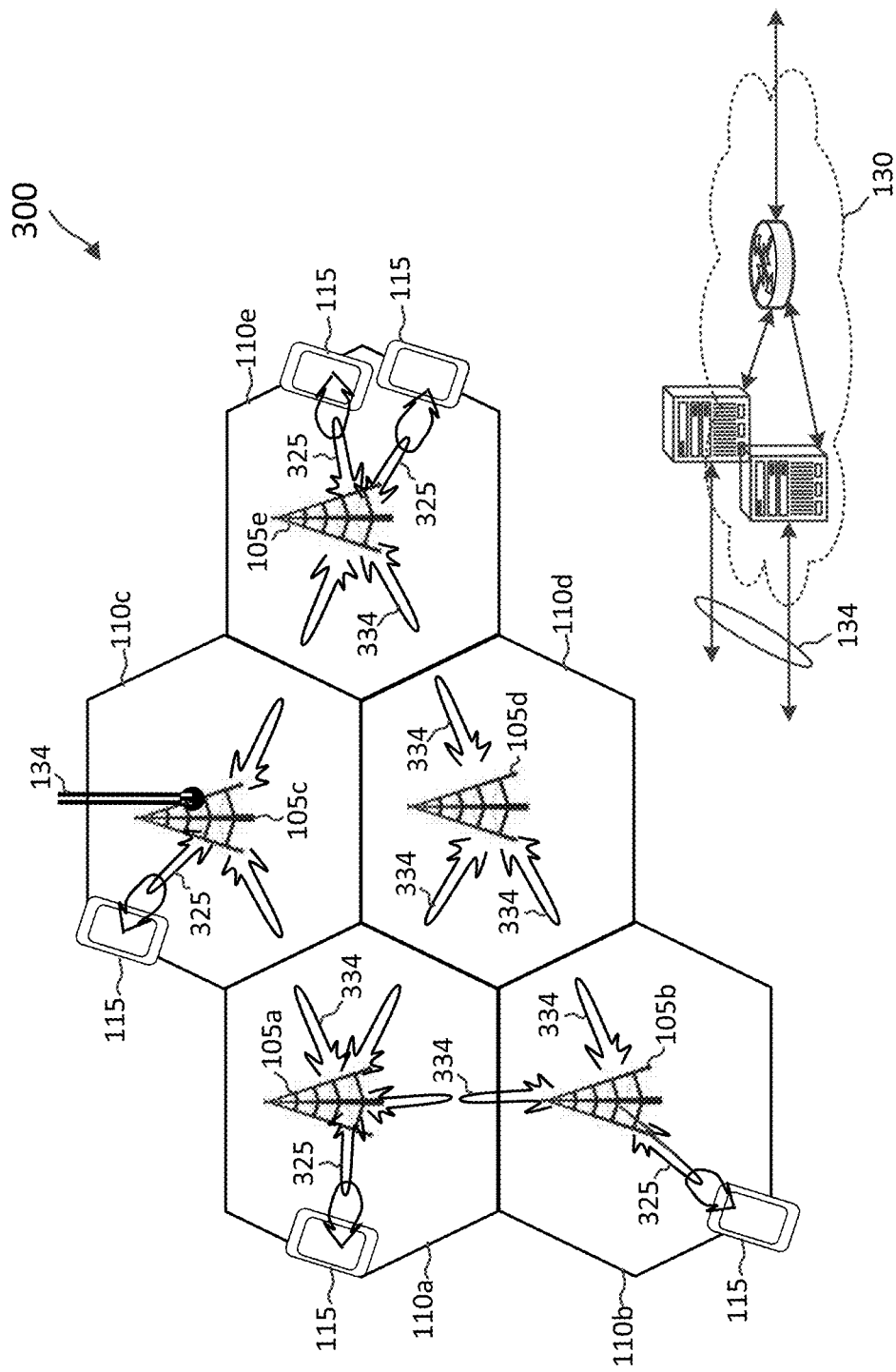
FIG. 3 illustrates an IAB network according to aspects of the present disclosure.

FIG. 3 illustrates an IAB network 300 according to aspects of the present disclosure. The network 300 is similar to the network 200 and illustrates the use of millimeter wave (mmWave) frequency band for communications. In the network 300, a single BS (e.g., the BS 105*c*) is connected to an optical fiber backhaul link 134. The other BSs 105*a*, 105*b*, 105*d*, and 105*e* communicate with each other and with the BS 105*c* using directional beams 334, for example, over the wireless links 234. The BSs 105 may also communicate with the UEs 115 using narrow directional beams 325, for example, over the wireless links 125. The directional beams 334 may be substantially similar to the directional beams 325. For example, the BSs 105 may use analog beamforming and/or digital beamforming to form the directional beams 334 and 325 for transmission and/or reception. Similarly, the UEs 115 may use analog beamforming and/or digital beamforming to form the directional beams 325 for transmission and/or reception. The use of mmWave can increase network throughput and reduce latency. The use of narrow directional beams 334 and 325 can minimize inter-link interference. Thus, the network 300 can improve system performance.

Figure 4A:
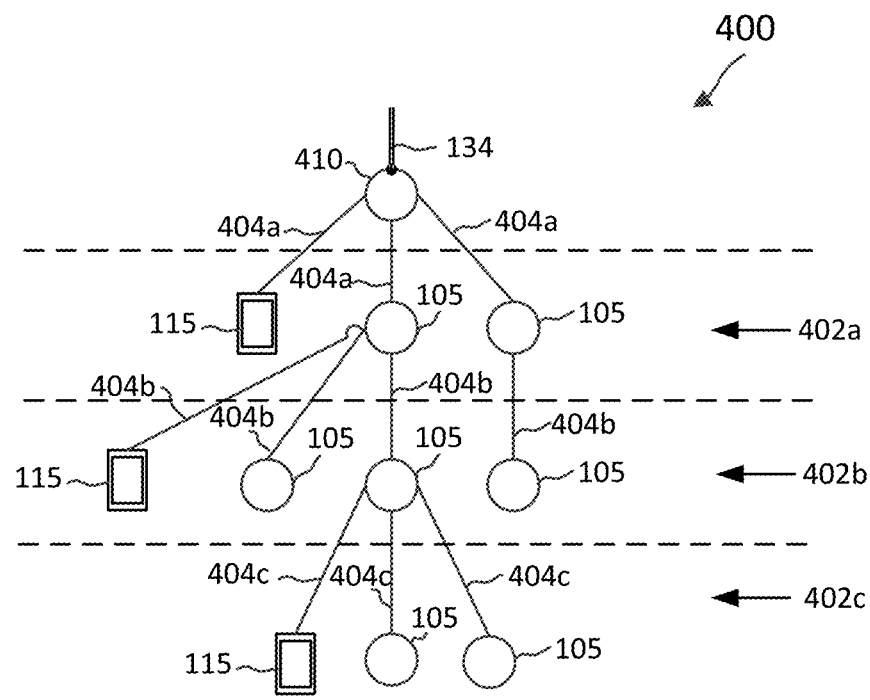
FIGS. 4A-4B illustrate an IAB network topology according to aspects of the present disclosure.
Figure 4B:
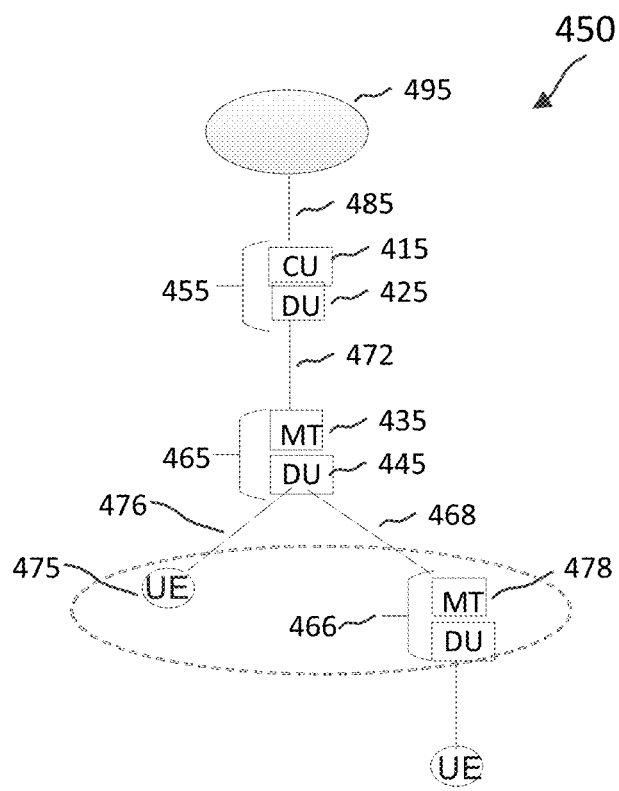

FIGS. 4A-4B illustrate an IAB network topology 400 according to aspects of the present disclosure. The topology 400 can be employed by the networks 200 and 300. For example, the BSs 105 and the UEs 115 can be configured to form a logical spanning tree configuration as shown in the topology 400 for communicating access traffic and/or backhaul traffic. The topology 400 may include an anchor 410 coupled to an optical fiber link 134 for communication with a core network (e.g., the core network 130). The anchor 410 may correspond to the BS 105c in the networks 200 and 300. The anchor 410 may also be known as an IAB donor and may include the function of controlling the IAB network topology 400 through configurations as well as the function of scheduling the communications of child IAB nodes or UEs (i.e., the IAB nodes or UEs directly linked to it via links 404). In some aspects, the anchor or IAB donor 410 includes a central unit (CU) that performs the former functions and a distributed unit (DU) that performs the latter functions. The CU can be a logical node hosting radio resource control (RRC), service data adaptation protocol (SDAP) and packet data convergence protocol (PDCP) of the anchor or IAB donor while the DU can be a logical node hosting radio link control (RLC), medium access control (MAC) and physical (PHY) layers of the anchor or IAB donor 410. The CU and the DU may be connected via an F1 interface, the application protocol (F1-AP) of which can be used for conveying the lower-layer configuration information of the radio bearers between the CU and DU, as well as for setting up of a General Packet Radio Services (GPRS) tunneling protocol (GTP) tunnel between the DU and CU for each radio bearer.

The topology 400 includes a plurality of logical levels 402. In the example of FIG. 4, the topology 400 includes three levels 402, shown as 402a, 402b, and 402c. In some other aspects, the topology 400 can include any suitable number of levels 402 (e.g., two, three, four, five, or six). Each level 402 may include a combination of UEs 115 and BSs 105 interconnected by logical links 404, shown as 404a, 404b, and 404c. For example, a logical link 404 between a BS 105 and a UE 115 may correspond to a wireless access link 125, whereas a logical link 404 between two BSs 105 may correspond to a wireless backhaul link 234. The BSs 105 and the UEs 115 may be referred to as relay nodes in the topology 400.

The IAB nodes (e.g., the BSs 105) in the level 402a can function as relays for the nodes in the level 402b, for example, to relay backhaul traffic between the IAB nodes and the anchor 410. Similarly, the IAB nodes (e.g., the BSs 105) in the level 402b can function as relays for the nodes in the level 402c. For example, the IAB nodes in the level 402a are parent nodes to the nodes in the level 402b, and the IAB nodes in the level 402c are child nodes to the nodes in level 402b. The parent nodes may function as access functionality (ACF)-nodes and the child nodes may function as user equipment functionality (UEF)-nodes. A parent node (e.g., an IAB donor, an anchor node, or a non-anchor IAB node) may have some control over resources of a child node (e.g., a non-anchor node or a UE) associated with the parent node.

For example, a BS 105 may implement both ACF and UEF and may function as an ACF-node and an UEF-node depending on which node the BS is communicating with. For example, a BS 105 in the level 402b may function as an access node when communicating with a BS 105 or a UE 115 in the level 402c. Alternatively, the BS 105 may function as a UE when communicating with a BS 105 in the level 402a. When a communication is with a node in a higher level or with a less number of hops to the anchor 410, the communication is referred to as a UL communication. When a communication is with a node in a lower level or with a greater number of hops to the anchor 410, the communication is referred to as a DL communication. In some embodiments, the anchor 410 may allocate resources for the links 404.

FIG. 4B shows an example IAB network with a network core 495 linked via a wireline fiber 485 to an IAB donor 455 including a CU 415 and a DU 425 and IAB donor 455 linked via link 472 to an IAB node 465. The entity or node of an IAB node 465 that functions as the ACF-node of the IAB node may be referred to as the DU 445 of the IAB node 465 and the entity or node of an IAB node 465 that functions as the UEF-node of the IAB node may be referred as the mobile termination (MT) 435 of the IAB node 465. The MT 435 of an IAB node 465 can be a scheduled node (e.g., similar to a UE) with its communications scheduled by the parent IAB-node 455 (i.e., the communications of MT 435 can be scheduled by its parent DU 425 of its parent IAB 455) or the IAB-donor (i.e., the anchor 410) and the DU 425 of an IAB node 455 can be a scheduling node that schedules the communications of child IAB node 465 (e.g., schedule its child MT 435 of the child IAB node 465) of that IAB node 465. In some cases, a DU 445 of a IAB node 465 may also schedule or control a UE 475. In some aspects, the DU of an IAB node (e.g., BS) may function as the logical node hosting the RLC, MAC and PHY layers of the IAB node. In some aspects, the CU of the IAB donor (e.g., BS) may function as the logical node of the hosting RRC, SDAP and PDCP.

Figure 5C:
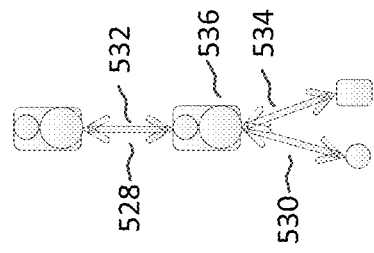
FIGS. 5A-5C illustrate duplex capabilities of an IAB node according to aspects of the present disclosure.
Figure 5B:
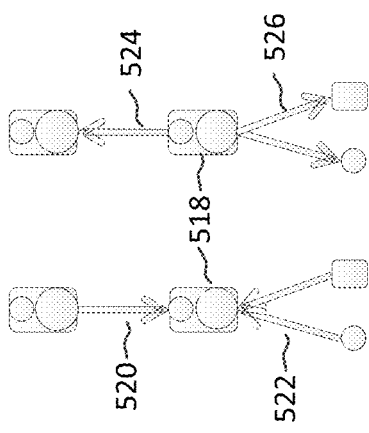
Figure 5A:
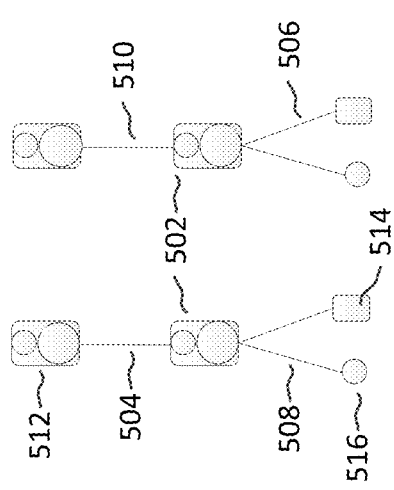

FIGS. 5A-5C illustrate duplex capabilities of an IAB node according to aspects of the present disclosure. In some aspects, IAB nodes (e.g., such as IAB nodes 105 or 465) of an IAB network can support duplex capabilities, i.e., the radio or communication resources of an IAB node may be orthogonally partitioned between the access links and the backhaul links of the IAB node according to the multiplex capabilities of the IAB node, which include partitioning the radio or communication resources of the node in time (i.e., time division multiplexing (TDM) capabilities), in frequency (i.e., frequency division multiplexing (FDM) capabilities), and in space (i.e., space division multiplexing (SDM) capabilities).

In some aspects, the IAB nodes can operate in-band, i.e., the DU and MT of the IAB node may operate or communicate using the same carrier frequencies. In some of such cases, however, the MT of a IAB node may not be configured to receive a communication when the DU of the same IAB node is transmitting, and vice versa. In other words, the IAB node may be half-duplex constrained, and a time-domain separation may be instituted between the operations of the MT and the DU of the IAB node. FIG. 5A shows an example schematic illustration of a IAB node 502 where the resources of the IAB node 502 are partitioned in time (i.e., using TDM capabilities of the IAB node) between the IAB node's backhaul links 504 and the access or child links 506. It is to be noted that when the backhaul links between the MT of the IAB node 502 and its parent DU (i.e., the DU of its parent IAB node 512) is active (504) or inactive (510), the access or child links between the DU of the IAB node 502 and the child MT (i.e., the MT of its child IAB node 514) or a UE 516 may be inactive (508) or inactive (506), respectively. In other words, the radio resources of the IAB node may be partitioned in time between the backhaul links (504 or 510) and the access links (506 or 508) during in-band operations of the IAB node 502.

In some aspects where the IAB node can be half-duplex constrained, a space-domain separation may be instituted between the operations of the MT and the DU of the IAB node, i.e., the resources of the IAB node may be partitioned in space according to the SDM capabilities of the IAB node. FIG. 5B shows an example schematic illustration of a IAB node 518 where the resources of the IAB node 518 are partitioned in space (i.e., using SDM capabilities of the IAB node) and the IAB node's backhaul links and access or child links are engaged simultaneously in signal reception RX (e.g., 520 and 522) or signal transmission TX (e.g., 524 and 526). That is, the DU and MT of the IAB node 518 can engage in simultaneous reception RX via the backhaul link 520 and the access link 522, or can engage in simultaneous transmission TX via the backhaul link 524 and the access link 526. FIG. 5C shows an example schematic illustration of a IAB node 536 where the resources of the IAB node 536 are partitioned in space (i.e., using SDM capabilities of the IAB node), and the IAB node's backhaul links and access or child links can be engaged simultaneously in both signal reception (e.g., 528 and 530) and signal transmission (e.g., 532 and 534).

Figure 6A:
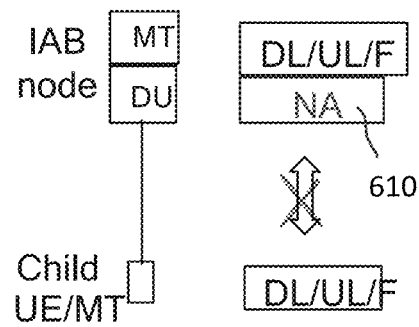
FIGS. 6A-6C illustrate operations of an IAB node based on the resource types of the IAB node according to aspects of the present disclosure.
Figure 6B:
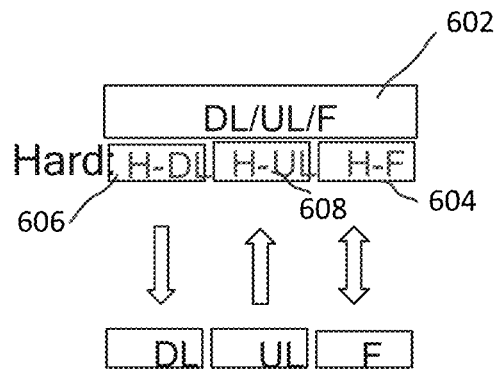
Figure 6C:
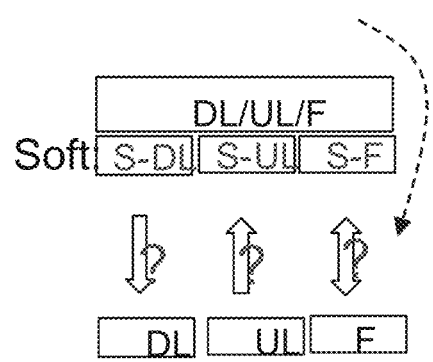

FIGS. 6A-6C illustrate operations of an IAB node based on the resource types of the IAB node according to aspects of the present disclosure. As noted above with reference to FIG. 5A, when a IAB node is half-duplex constrained, TDM of the resources of the IAB nodes may be employed to facilitate communication between neighboring IABs. The DU and/or MT time-domain resources of a IAB node can be configured as uplink (UL), downlink (DL) and flexible (F) to indicate the allowed transmission directions for that resource type (DU or MT). Due to the half-duplex constraint, however, a MT resource's configuration may not necessarily indicate that the MT is available in the configured transmission direction, since the availability of a MT resource can depend on the configuration of the corresponding DU resource. The availabilities of the DU and MT resources can be coordinated by configuring the DU resources as hard (H), soft (S) and not available (NA), as discussed in the 3GPP standard document technical specification (TS) 38.873, titled "Study on Integrated Access and Backhaul (3GPP TS 38.873)", which is incorporated herein by reference in its entirety.

That is, in an IAB network, resources (such as time resources or another type of resource) may be configured as downlink-only, uplink-only, flexible, or not available (e.g., unavailable). When a resource is configured as downlink-only for an IAB node, that time resource may be available for only downlink communications of the IAB node, and not uplink communications. Similarly, when a time resource is configured as uplink-only for an IAB node, that resource may be available for only uplink communications of the IAB node, and not downlink communications. When a resource is configured as flexible for an IAB node, that resource may be available for both downlink communications and uplink communications of the IAB node. When a resource is configured as not available for an IAB node DU, the resource may not be used for any communications by the IAB node DU with its child IAB node. It should be noted that the techniques and apparatuses described herein for time resources can be applied for any type of resource (e.g., frequency resource, spatial resource, code resource, and/or the like).

Further, as noted above, resources in an IAB network that are configured as downlink-only, uplink-only, or flexible may be further configured as hard resources or soft resources. When a resource is configured as a hard resource for an IAB node DU, in some aspects, the resource can be always available for communications by the IAB node DU with its child IAB node. For example, a hard downlink-only resource can always be available for only downlink communications of the IAB node DU, a hard uplink-only resource can always be available for only uplink communications of the IAB node DU, and a hard flexible resource can always be available for uplink and downlink communications of the IAB node DU.

A hard DU configuration indicates that the DU resource is available for the DU in the configured transmission direction without the IAB node that includes the DU having to consider the impact of the availability on the resources of the corresponding MT (i.e., MT of the same IAB). That is, hard DU resources can indicate that the DU resources are available for transmission/reception (TX/RX) by the DU while the MT resources are unavailable regardless of the configurations of the MT resource. That is, when DU resources are configured as hard, it cannot be guaranteed that the MT can properly transmit or receive on these resources while the DU can use these resources regardless of the MT resource configurations. FIG. 6B shows a schematic illustration of hard DU resources configured for downlink (DL) 606, uplink (UL) 608 and flexible (F) 604 transmission by a DU of a IAB node may be available regardless of the configurations of the MT (e.g., 602) of the same IAB. A Not Available DU configuration, such as the example illustration shown in FIG. 6A, indicates that the N/A DU resource 610 may not be available for the DU, and as such, the DU cannot assume or expect the resource to be available for its TX/RX. A MT's or UE's resource configuration for TX/RX may be scheduled by a parent IAB node or via an radio resource control (RRC) configuration message from the control unit (CU) of the IAB-donor (of the IAB network of which the IAB is a part).

When a resource is configured as a soft resource for an IAB node DU, the availability of that resource can be controlled by a parent node of the IAB node. For example, the parent node may indicate (e.g., explicitly or implicitly) whether a soft resource is available for communications of the IAB node DU. Thus, a soft resource may be in one of two states: an available state (e.g., when the soft resource can be available for scheduling and/or communications of the IAB node DU) and a non-available state (e.g., when the soft resource may not be available for scheduling and may not be available for communications of the IAB node DU).

For example, a soft downlink-only resource is only available for downlink communications of the IAB node when a parent node of the IAB node indicates that the soft downlink-only resource is available. Similarly, a soft uplink-only resource is only available for uplink communications of the IAB node when a parent node of the IAB node indicates that the soft uplink-only resource is available. A soft flexible resource is only available for uplink and downlink communications of the IAB node when a parent node of the IAB node indicates that the soft flexible resource is available.

As discussed above, a soft DU configuration can come in two states, an available state and a non-available state. An available state is where the IAB node has indication from its parent IAB node that the DU resource configured as available has been indicated, explicitly or implicitly, as available. For example, a parent IAB node may indicate, via a downlink control information (DCI) transmission (e.g., such as DCI2_5 message), that the DU resource is available for transmission by the DU. A non-available state is where the IAB node has no indication from its parent IAB node that the DU resource configured as non-available has been indicated, explicitly or implicitly, as available. For example, the IAB node may have no indication from its parent IAB that the DU resource is available for transmission by the DU. FIG. 6C shows a schematic illustration of soft DU resources configured for downlink (DL), uplink (UL) and flexible (F) direction transmission by a DU of a IAB node, the availabilities of which can be controlled by a parent node of the IAB node (or IAB-donor of the IAB network that includes the IAB node).

In some aspects, an available DU resource may be considered as a hard DU resource, and a non-available resource may be considered as a N/A DU resource. In yet some aspects, a soft DU resource may indicate that the soft DU resource can be used by the DU if that does not impact the MT's ability to transmit and/or receive according to the MT's configuration and scheduling. For example, a DU resource may be configured as soft DU. In such example, if a MT resource is configured as uplink but there is no uplink data for the MT to transmit or the MT does not have a valid uplink scheduling grant, the DU can use the soft DU resource for TX/RX. In other words, a DU can use a soft DU configured resource provided the DU's use is not impacting the MT's TX/RX.

As discussed above, a IAB network includes multiple IAB nodes (e.g., BSs) communicating with each other, either directly or indirectly (e.g., through the core network of the IAB network), over backhaul links and UEs communicating with the IAB nodes via access links (e.g., wireless access links). These communications can use NR technology, designed to operate across different spectrum types, from licensed spectrum to unlicensed and shared spectrum. The operations or deployments of NR in an unlicensed spectrum is referred to as NR-U. One approach to avoiding collisions when communicating in a shared spectrum or an unlicensed spectrum is to use a listen-before-talk (LBT) channel access procedure to ensure that the shared channel is clear before transmitting a signal in the shared channel. FIGS. 7A-7D illustrate such channel access procedures for NR-U according to aspects of the present disclosure.

Figure 7A:
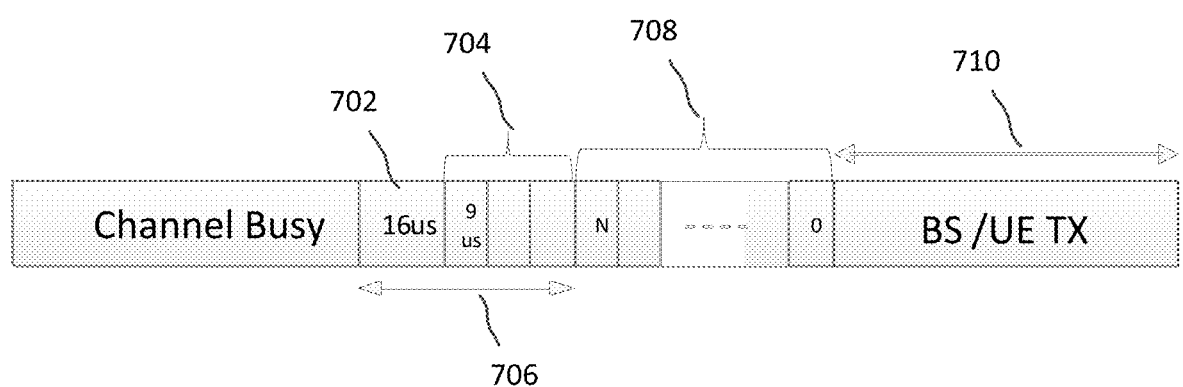

FIG. 7A shows an example schematic illustration of a type 1 LBT channel access procedure according to some aspects of the present disclosure. LBT refers to spectrum sharing mechanism by which a device (e.g., an IAB node) senses the channel using a clear channel assessment (CCA) check before accessing to it. Type 1 channel access procedure refers to an LBT with random back-off with a contention window of fixed size, in which the extended CCA period is drawn by a random number within a fixed contention window. For example, with reference to FIG. 7A, a device such as an IAB node initiating a transmission may initially wait for the channel to be idle for 16 µs (e.g., 702), and the device may determine that the channel is idle if the device does not detect energy in the channel above some energy detection threshold level (e.g., between −75 and −85 dBm/MHz). Upon determining that the channel has been idle for 16 µs, the device may then proceed to perform a CCA after each of the m required observation or sensing slots 704 (e.g., shown for m=3 in FIG. 7A), where each slot lasts at least 9 µs. A successful CCA decrements m by 1, whereas channel occupancy resets m. Once m reaches 0, i.e., after a defer period 706 that includes the idle period of 16 µs and the duration for the observation slots 704, the device can proceed to the backoff stage. For the backoff stage, the device can select a random whole number N in {0, . . . , CW}, where CW is the contention window. CCA may then be performed for each observation slot and can result either in decrementing N by 1 (e.g., 708) or freezing the backoff procedure. Once N reaches 0, a transmission 710 may commence. The length of the transmission 710, i.e., the channel occupancy time (COT) for the device, can be upper bounded by a maximum channel occupancy time (MCOT $T_{mcot}$) (e.g., no greater than 10 ms) which can vary based on the priority class of the transmission. A transmission with a lower or higher priority class number may have a higher or lower chance of acquiring a channel because the contention window (CW) has shorter or longer duration, respectively. If the transmission is successful, the responding device may send an immediate acknowledgement (e.g., without a CCA) and reset CW to the minimum value of CW, $CW_{min}$. If the transmission fails, the CW value may be doubled (up to the maximum value of CW, $CW_{max}$) at the transmission initiating device before the next retransmission. FIG. 7B shows a table of the values of the number of observation or sensing slots $m_p$, $CW_{min,p}$, $CW_{max,p}$, $T_{mcot}$ and allowed $CW_p$ sizes for channel access priority class p. Classes with higher priority can have lower m and lower {CWmin, CWmax} and this higher priority in channel access can be offset by $T_{mcot}$, where the lower priority classes can transmit for longer in a single burst. The higher priority classes can transmit for shorter periods as the packet sizes can be shorter and have multiple bursts for higher-priority transmissions.

Figure 7C:
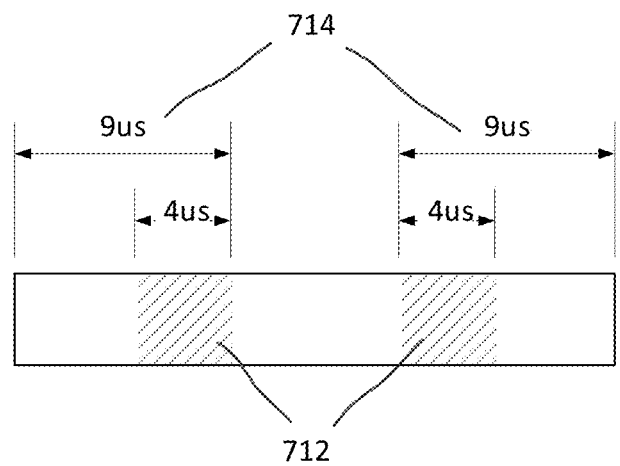
Figure 7D:
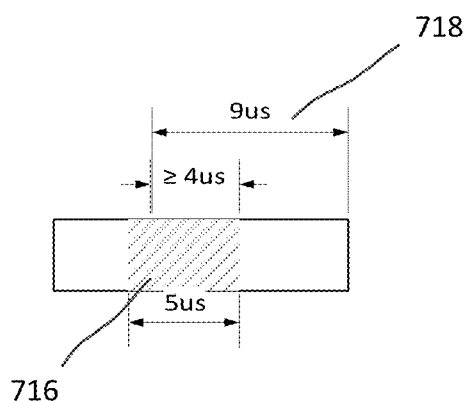

FIGS. 7C-7D show example schematic illustrations of type 2 LBT channel access procedures according to some aspects of the present disclosure. Type 2 channel access procedures refer to LBT with no random back-off but rather deterministic CCA or channel sensing period. FIG. 7C shows example schematic illustration of type 2A LBT channel access procedure according to some aspects of the present disclosure. Type 2A refers to a channel access procedure with a deterministic channel sensing period of 25 µs for when the gap between a UL physical uplink shared channel (PUSCH) transmission grant being transmitted in a DL direction and the UL PUSCH transmission start time may be 25 µs or more (e.g., can be as long as several ms). The channel sensing period is 25 µs when the gap between an UL transmission and a DL transmission is exactly 25 µs, and in some respects, the channel access procedure is a type 2A channel access procedure only when the transmission gap is exactly equal to 25 microseconds. Channel sensing 712 may occur for at least 4 µs within a 9 µs period 714 of the gap. Type 2B channel access procedure refers to a channel access procedure with a deterministic channel sensing period of 16 µs, i.e., a 16 µs sensing period is required before a transmission can commence, and can be applicable for when the gap between an UL transmission and a DL transmission, between an UL transmission and an UL transmission, between a DL transmission and an UL transmission, or between a DL transmission and a DL transmission is equal to 16 µs. Type 2C channel access procedure refers to a channel access procedure where no sensing is required (e.g., channel sensing period=0) before a transmission when the gap between an UL transmission and a DL transmission, between an UL transmission and an UL transmission, between a DL transmission and an UL transmission, or between a DL transmission and a DL transmission is less than or equal to 16 µs. Channel sensing 716 may occur for at least 4 µs within a 9 µs period 718 of the gap. An example illustration of a listen-before-talk (LBT) channel access procedure is shown in FIG. 7E.

FIG. 7E shows a timing diagram illustrating a listen-before-talk (LBT) channel access procedure according to some aspects of the present disclosure. The scheme 750 may be employed by a BS such as the BSs 105 and a UE such as the UEs 115 in a network such as the network 100. In particular, a BS or a UE may employ scheme 750 to determine measurement periods within a link switch duration for LBT measurements. In FIG. 7E, the x-axis represents time in some constant units. As an example, a wireless communication device (e.g., a BS or a UE) receives a communication signal 760 (shown as Rx signal) and completes the reception at time T0 in a certain link direction (e.g., UL or DL). After receiving the communication signal 760, the wireless communication device switches to another link direction (e.g., UL-to-DL or DL-to-UL) and transmits a communication signal 770 (shown as Tx signal) starting at time T1. In an example, the wireless communication device corresponds to a BS, the communication signal 760 is an UL communication signal (e.g., including PUSCH data and/or physical uplink control channel (PUCCH) control information transmitted by a UE), and the communication signal 770 corresponds to a discovery reference signal (DRS) (e.g., including synchronization signal blocks (SSBs)) or any DL communication signal including Physical Downlink Shared Channel (PDSCH) data and/or Physical downlink Control Channel (PDCCH) control information. In another example, the wireless communication device corresponds to a UE, the communication signal 760 is a DL communication signal (e.g., including PDSCH data and/or PDCCH control information transmitted by a BS), and the communication signal 770 corresponds to a scheduled UL transmission (e.g., including PUSCH data and/or PUCCH control information) in a COT acquired or reserved by the BS. The wireless communication device may perform a LBT channel access procedure (e.g., a type 2 LBT) prior to transmitting the communication signal 770.

It should be noted that in some instances the switching gap can be longer than the duration of the measurement period considered for LBT. For example, as discussed above, the time or gap between a UL PUSCH transmission grant being transmitted in a DL direction and the UL PUSCH transmission start time may be as long as several ms, but the LBT may be performed for just a fixed duration (e.g., about 25 μs) prior to the PUSCH transmission. It should be noted that in some instances such fixed duration LBT channel access procedures (type 2 LBT) may be used without any switch in direction. For example, for DRS transmission, a BS may use a fixed duration (e.g., about 25 μs) LBT just prior to the DRS transmission.

The scheme 750 time-partitions a link switch gap duration 752 between the received communication signal 760 and the scheduled or upcoming transmit communication signal 770 or more generally the type 2 LBT duration into about three slots 754 (shown as $754_{S(1)}$, $754_{S(2)}$, and $754_{S(3)}$). In an example, the link switch gap duration 752 may be about 25 μs, the slot $754_{S(1)}$ may have a duration of about 9 μs, the slot $754_{S(2)}$ may have a duration of about 7 μs, and the slot $754_{S(3)}$ may have a duration of about 9 μs. The scheme 750 allows LBT measurements during the slots $754_{S(1)}$ and $754_{S(3)}$, but not during the slot $754_{S(2)}$. Additionally, the scheme 750 requires an LBT measurement duration of at least 4 μs. LBT measurements may refer to energy detection or measurements.

In an example, the wireless communication device may determine whether the channel is available by performing energy detection during a measurement period 756a within the slot $754_{S(1)}$ and during a measurement period 756b within the slot $754_{S(3)}$. The wireless communication device measures channel energy for a duration of at least 4 μs to determine a channel status (e.g., idle or occupied). In other words, each of the measurement periods 756a and 756b may have a duration of at least 4 μs. The wireless communication device may select any 4 μs within the slots $754_{S(1)}$ and $754_{S(3)}$ for channel energy measurements and refrain from performing energy detection during the slot $754_{S(2)}$. In some examples, the wireless communication device may perform energy detection in a beginning portion of the slot $754_{S(1)}$ or the slot $754_{S(3)}$ and use the remaining time of the corresponding slots 754 for processing the energy measurement. An LBT channel access procedure is a pass when the measurements in the measurement periods 756a and 756b are below a certain energy detection threshold. Conversely, an LBT channel access procedure fails when the measurement in the measurement period 756a or the measurement in the measurement period 756b is equal to or greater than the energy detection threshold.

Figure 8A:
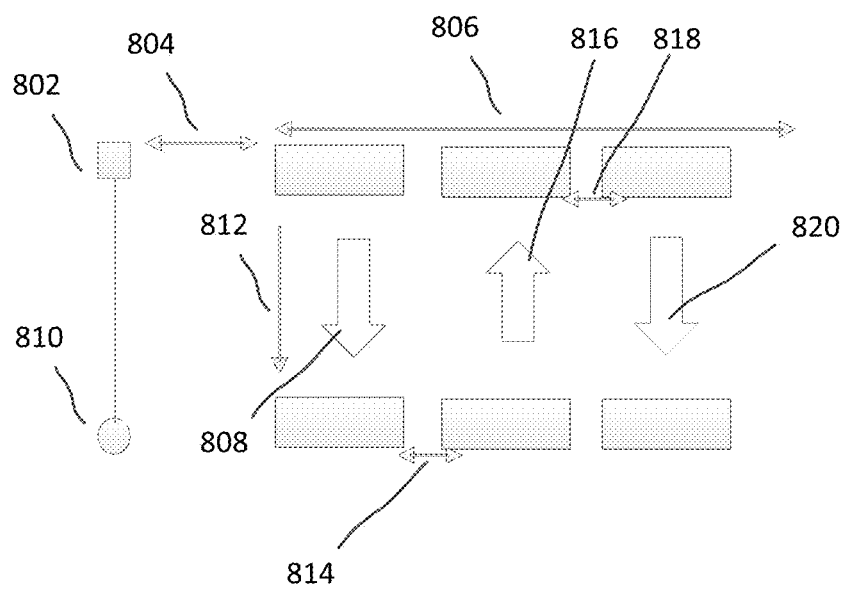
FIGS. 8A-8D illustrate channel occupancy time (COT) sharing between a next generation NodeB (gNB) and a user equipment (UE) according to aspects of the present disclosure.

As noted above, a device such as a BS may perform a channel access procedure (e.g., type 1 LBT channel access procedure) to acquire or reserve a COT for a channel in an unlicensed 5G spectrum for signal transmission to a UE. In some cases, the COT may be longer than what is needed for transmission by the BS and the BS may share the COT with the UE so that the UE may use part of the COT for signal transmission back to the BS. When sharing the COT in a channel with the UE, in some aspects, the BS may explicitly indicate, via an UL scheduling grant, what kind of channel access procedure the UE must perform to be able to access the channel and use the COT for an UL transmission to the BS. For example, the BS may indicate to the UE, via the UL scheduling grant, the type of channel access procedure the UE may perform to access the channel within the COT depending on the gap between the DL transmission from the BS and the UL transmission by the UE, i.e., depending on which condition of the type 1 or type 2 channel access procedures that the gap meets. For example, the BS may indicate to the UE to perform type 2A, type 2B or type 2C channel access procedure if the gap is 25 μs, 16 μs or less than or equal to 16 μs, respectively. In some cases, when the UL scheduling grant indicates to the UE that the UE should perform type 1 channel access procedure, the UE may still perform (e.g., autonomously despite the indication from the BS) a type 2 procedure (e.g., type 2A) provided that the time gap conditions for the type 2 procedure are met. The UE may determine the conditions are met based on the remaining COT indicated as being available in the DCI transmission (e.g., DCI2_0 message) by the BS to the UE. FIG. 8A shows an example schematic illustration of a COT initiated by a BS and shared with a UE. A BS 802 may perform a type 1 channel access procedure 804 to acquire a COT 806 that is no greater in duration than the sum of MCOT ($T_{mcot}$) and $T_g$, and the BS 802 may use some of the COT 806 for a DL transmission 808 to the UE 810. In some aspects, $T_g$ can be the total duration of all gaps of duration greater than 25 μs that can occur between the DL transmission of the BS and UL transmissions scheduled by the BS, and between any two UL transmissions scheduled by the BS starting from $t_o$, where $t_o$ is the time instance where BS has started transmission. The DL transmission 808 may also include a DCI transmission 812 (e.g., DCI 2_0 message) indicating the COT remaining after the DL transmission 808 by the BS 802. Based on the information in the DCI2_0 message 812 indicating the remaining amount of COT, the UE 810 perform a type 1 or type 2 channel access procedure 814 for an UL transmission 816 to the BS 802. As mentioned above, the UE 810 may autonomously switch to a type 2 procedure despite the DCI2_0 message indicating a type 1 procedure provided that the conditions for a type 2 procedure are fulfilled by the remaining COT. In some cases, there may still be available COT left after the UL transmission 816 by the UE 810, and the BS 802 may perform type 2 channel access procedure 818 to access this available COT for additional DL transmission 820. In FIG. 8A, the x-axis represents time in some arbitrary units.

Figure 8B:
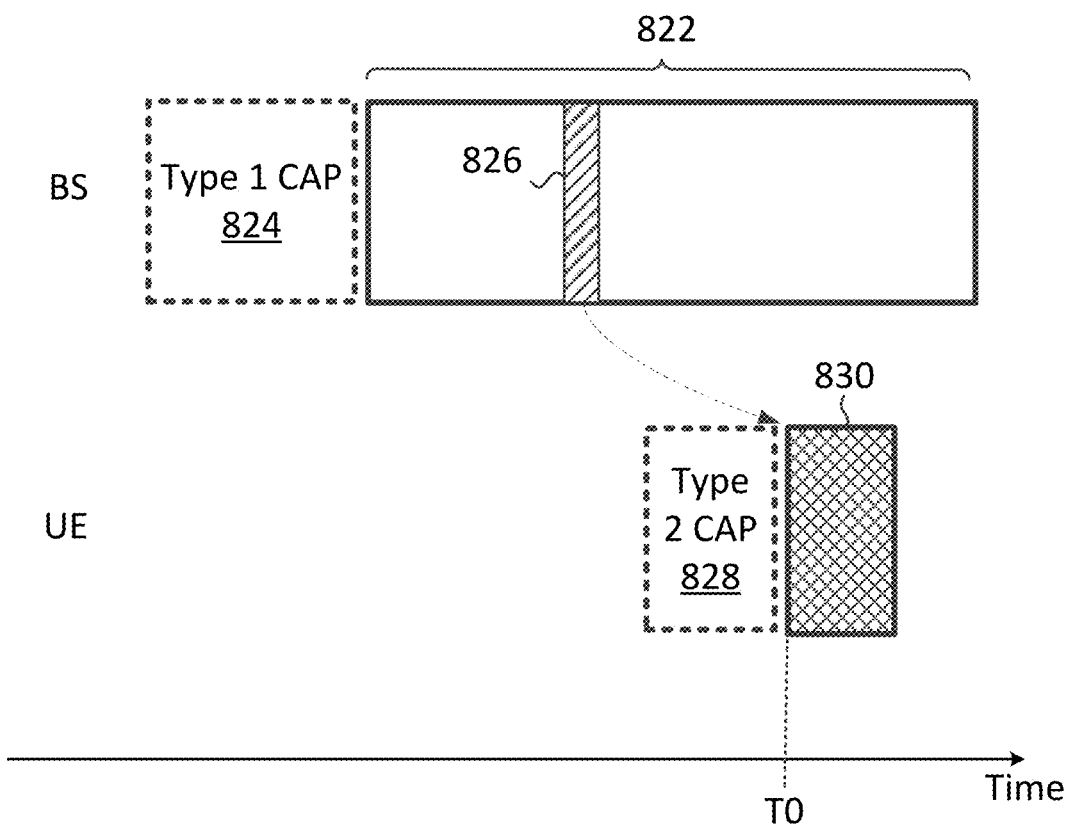

FIG. 8B is a timing diagram illustrating the sharing of a BS initiated COT between the BS and a UE according to some aspects of the present disclosure. The COT sharing may be initiated by BSs such as the BSs 105 for COT sharing with UEs such as the UEs 115 in a network such as the network 100. In FIG. 8B, the x-axis represents time in some arbitrary units.

In some aspects, a BS (e.g., BS 105 in FIG. 1) contends for a COT 822 by performing a type 1 channel access procedure (CAP) 824 in a shared channel. Upon passing the type 1 CAP 824, the COT 822 may begin. The BS may schedule the UE for UL and/or DL communications during the COT 822. As shown, the BS transmits a UL scheduling grant 826 to schedule the UE for a UL communication at a time T0 within the COT 822. The scheduling grant 826 may indicate resources (e.g., time-frequency resources) allocated for the UL communication and/or transmission parameters for the UL communication. Upon receiving the UL scheduling grant 826, the UE performs a type 2 procedure 828 prior to the scheduled time T0. A type 2 procedure may be referred to as channel access procedure without a random backoff. A type 2 procedure may also be referred to as a one-shot LBT. At time T0, upon passing the type 2 CAP 828, the UE transmits a UL communication signal 830 based on the UL scheduling grant 826. The UL communication signal 830 can include UL data and/or UL control information. In an example, the UL data may be carried in a PUSCH and the UL control information may be carried in a PUCCH. The UL control information may include scheduling request, channel information (e.g., CSI reports), and/or hybrid automatic repeat request (HARQ) acknowledgement/negative-acknowledgement (ACK/NACK) feedbacks.

In some aspects, the COT may initially be initiated or acquired by the UE as part of a UL transmission to the BS and may be shared with the BS for a DL transmission by the BS to the UE. For example, the UE may initiate a COT in a channel of an unlicensed 5G spectrum by performing a type 1 channel access procedure and use some of the COT for an UL transmission, and share the remaining COT with the BS for an UL transmission by the BS to the UE. In such cases, the BS may autonomously determine what type of channel access procedure to perform to access the COT. This is because, since DL/UL communications between the BS and the UE are controlled by the BS, the BS may have information about remaining COT. That is, if the COT is initiated by the UE because of an UL transmission scheduled by a dynamic DCI grant from the BS, then the BS can indicate the channel access priority class in the UL for the UE's use in performing a type 1 channel access procedure and the BS can determine the maximum COT according to the priority class (and, for example, determine the remaining COT based on the maximum COT since the BS controls the UE's UL communication with the BS). If, on the other hand, the UE's COT is initiated by the UE because of a UL transmission configured by a RRC configured grant, then the UE can communicate information related to the remaining COT via a configured grant (CG)-uplink control information (UCI) message. For semi-static UL transmissions such as physical random access channel (PRACH) transmissions, physical uplink control channel (PUCCH) transmissions, sounding reference signals (SRSs), etc., the channel access priority class can be pre-defined (e.g., in a specification).

Figure 8C:
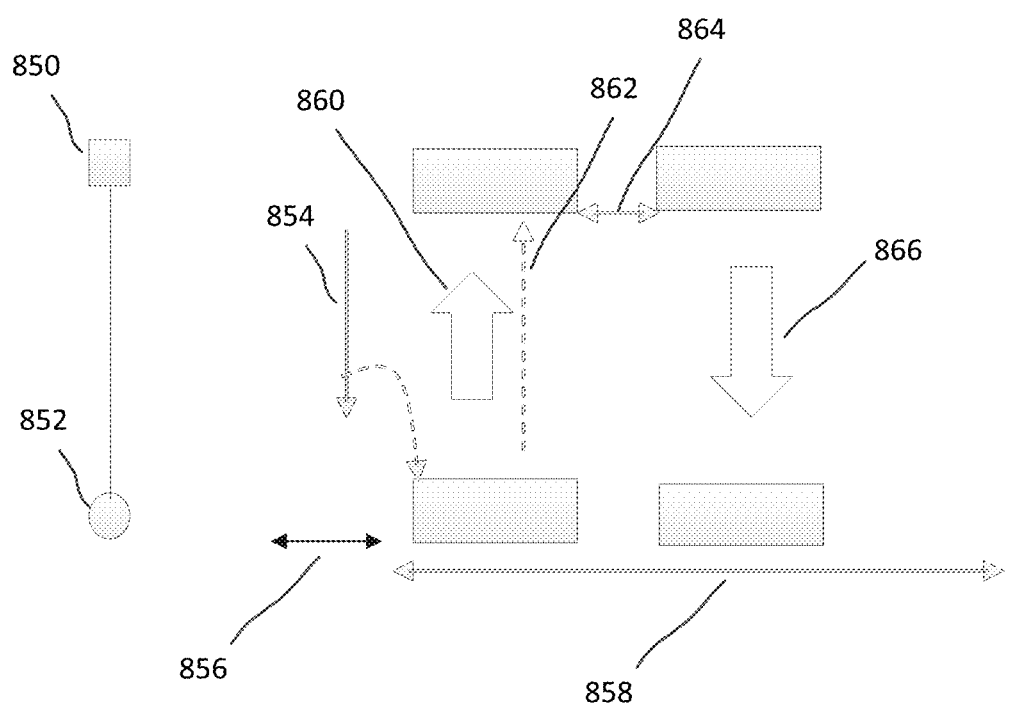

FIG. 8C shows an example schematic illustration of a COT initiated by a UE and shared with a BS. Following an UL scheduling grant 854 from the BS 850 to the UE 852, the UE 852 may perform a type 1 channel access procedure 856 to acquire a COT 806 that is no greater in duration than the MCOT ($T_{mcot}$), and the UE 852 may use some of the COT 858 for a UL transmission 860 to the BS 850. The UL transmission 860 may also include a GC-UCI 862 indicating the COT remaining after the UL transmission 860 by the UE 852. Based on the information in the GC-UCI 862 indicating the remaining amount of COT, the BS 850 may perform a type 2 channel access procedure 864 for an DL transmission 866 to the UE 852. In FIG. 8C, the x-axis represents time in some arbitrary units.

Figure 8D:
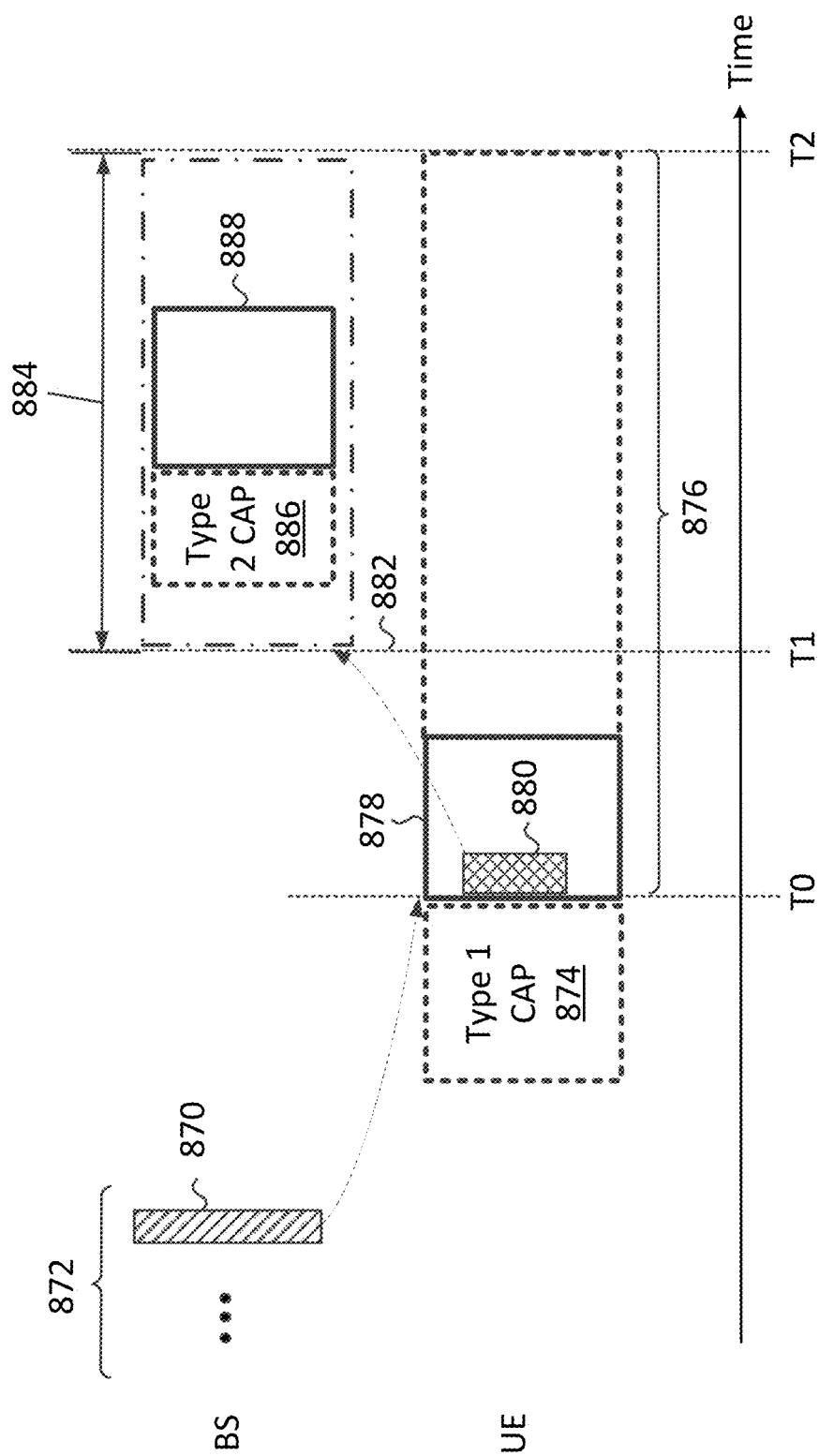

FIG. 8D is a timing diagram illustrating the sharing of a BS initiated COT between the BS and a UE according to some aspects of the present disclosure. The COT may be initiated by the UEs such as the UEs 115 for sharing with the BSs such as the BSs 105 in a network such as the network 100. A UE may initiate a COT based on an UL schedule received from a BS and share the COT with the BS for DL communication. The BS and the UE may use substantially similar channel access procedures mechanisms as described above. In FIG. 8D, the x-axis represent time in some arbitrary units.

In FIG. 8D, the BS transmits a UL scheduling grant 870 in the COT 872 to schedule the UE for a UL transmission at a time T0 outside of the BS's COT 872. The UE performs a type 1 CAP 874 prior to the scheduled time T0. Upon passing the CAP 874, the UE gains a COT 876 and transmits a UL communication signal 878 beginning at the scheduled time T0 according to the UL scheduling grant 870. The COT 876 may include a duration longer than the transmission duration of the UL communication signal 878. For example, the COT 876 may end at time T2 based on a contention window length used for performing the type 1 CAP 874.

Accordingly, the UE may share the COT 876 with the BS for DL communication. In an aspect, the UE includes COT sharing information 880 in the UL communication signal 878. The COT sharing information 880 may indicate that the BS is allowed to share the UE's COT 876 for communication. The COT sharing information 880 may indicate a sharable portion of the UE's COT 876 starting at a time 882 (e.g., at time T1) with a duration 884 as shown by the dashed-dotted box. In the context 5G or NR, the UL communication signal 878 may be a PUSCH signal and the COT sharing information 880 may be a PUCCH signal or a UL control information (UCI) message (e.g., CG-UCI). Upon receiving the COT sharing information 880, the BS performs a type 2 CAP 886 and transmits a DL communication signal 888 during a period within the sharable duration 884. The DL communication signal 888 may include DL control information (e.g., DL scheduling grants) and/or DL data.

The use and sharing of a COT as discussed above, whether initiated by a UE or a BS, may follow certain rules. For example, a BS may be allowed to use a COT the BS initiated or acquired for DL/UL communications with a UE for other DL/UL communications related to the BS (e.g., for DL/UL communications with another UE that the BS is connected to). For instance, if the COT is initiated by BS for communication with a first UE, the BS can use the COT for communication with a second UE as long as the gap between the DL transmissions to the first UE and the second UE is no greater than 16 μs. As another example, a UE may be allowed to use a COT the UE initiated or acquired for DL/UL communications with a BS for other DL/UL communications related to the BS. For instance, if the COT is initiated by a UE, the UE can use the COT for communication with the serving BS as long as the gap between UL transmissions to the BS is no greater than 16 μs.

With respect to the sharing of a COT, a BS may share with a second UE what remains of a COT the BS initiated for communication with a first UE. That is, the BS may use the remaining COT to communicate with the second UE or share the remaining COT with the second UE so that the second UE can communicate with the BS (e.g., transmit a UL transmission). For a COT initiated by a UE, the UE can share the COT with a BS for the transmission by the BS back to the UE. In some cases, the BS may not be allowed to use the remaining (i.e., shared by the UE) COT for communication with another UE.

The sharing of a COT in a channel of a 5G unlicensed spectrum as discussed above refers to a COT initiated or acquired by a BS or a UE that are linked to each other via an access link. The sharing of a COT in an IAB network (e.g., such as one shown in FIGS. 4A-4B) may, however, include additional features as an IAB network includes multiple IAB nodes (e.g., BSs) communicating with each other, either directly or indirectly, over backhaul links and communicating with UEs via access links. For example, with respect to FIG. 4B, the IAB network 450 includes an IAB node 465 linked to another IAB node 466 via a backhaul link 468 and to a UE 475 via an access link 476. Further, as discussed above, each IAB node may include a DU and an MT where the DU may serve as a parent DU node to a child MT of a child IAB node and the MT may serve as a child node to a parent DU of a parent IAB node. For example, IAB node 465 may include a DU 445 that functions as a parent DU node to the child MT 478 of the child IAB node 466 as well as a child MT node 435 that is a child MT to a parent DU node 425. In addition, due to the half-duplex constraint discussed above, an IAB node may or may not be available for communication based on its resource type. As such, COT sharing in an IAB network may depend on the functionality type of the IAB node (e.g., whether the COT is initiated or acquired for communication by the DU or the MT of the IAB node) and the resource type of the IAB node (e.g., whether the DU resource type is hard, soft, Not Available).

Aspects of the present disclosure disclose the sharing of a COT across IAB nodes of an IAB network. For example, according to aspects of the present disclosure, a COT-initiating IAB node may share the COT with a parent or child IAB node, which may use the COT for communication with or in turn share the COT with an IAB node (e.g., its own parent or child IAB node) that is different from the COT-initiating IAB node. This type of COT sharing may not in accordance with the COT-sharing principle that a COT shared by an entity (e.g., an IAB node or a UE) is to be used by the receiving IAB node or UE for communication with the COT initiating IAB node or UE, or that the COT is not to be shared with a third IAB node (different from the COT-initiating IAB node).

Figure 9A:
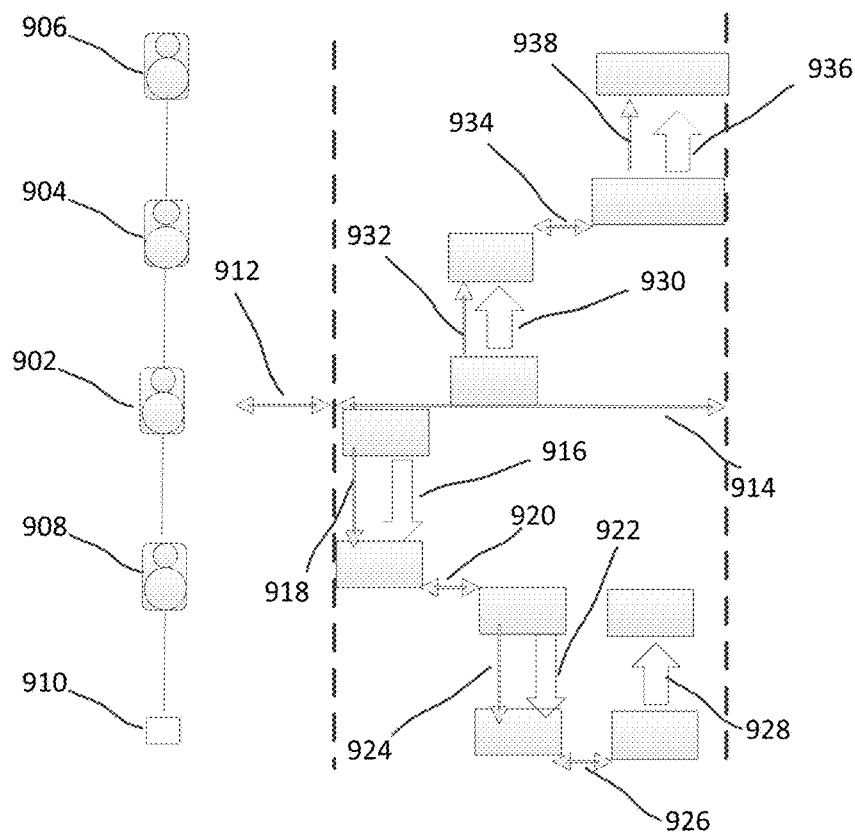
FIGS. 9A-9B illustrate example COT sharing across IAB nodes of an IAB network according to aspects of the present disclosure.
Figure 9B:
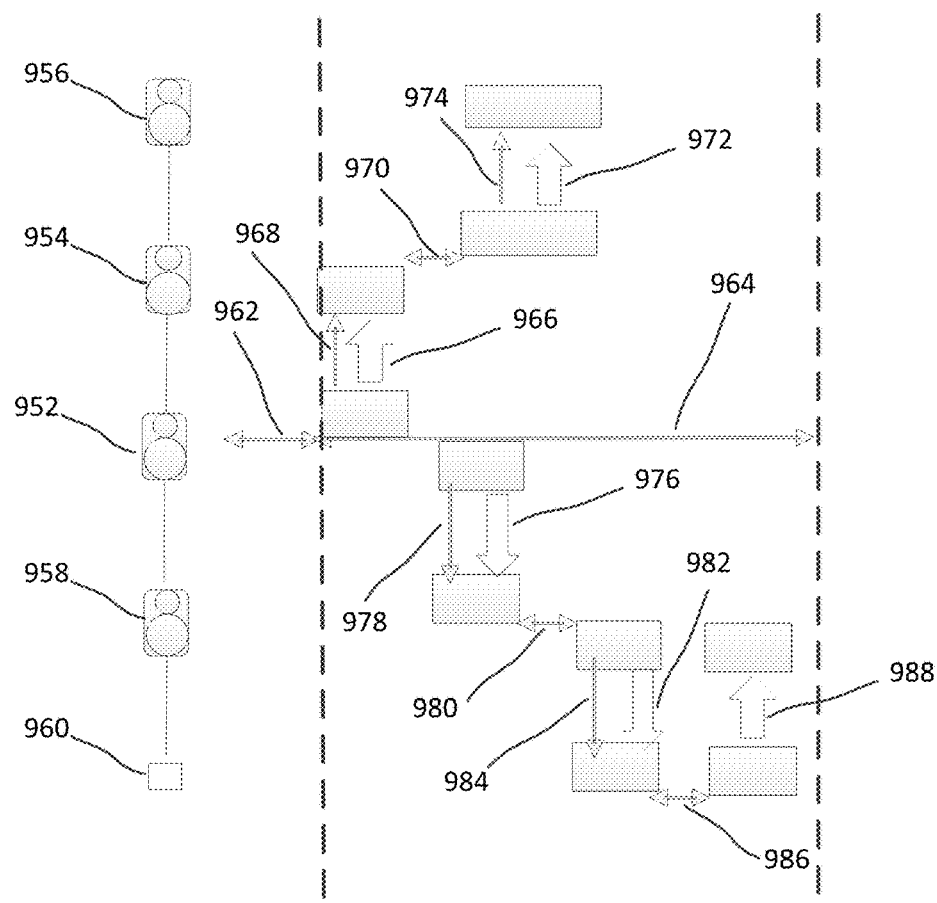

In some aspects of the present disclosure, a COT-sharing approach that does not comply with the above-noted sharing principle is disclosed herein. The COT is for a channel in an unlicensed 5G spectrum across IAB nodes in an IAB network, and the COT-initiating IAB node may share the COT with a parent or child IAB node, which may use the COT for communication, or in turn share the COT, with a third IAB node (e.g., its own parent or child IAB node that is different from the COT-initiating IAB node). FIGS. 9A-9B illustrate example COT sharing of COT initiated for communications by a DU and a MT, respectively, of an IAB node across IAB nodes of an IAB network, according to aspects of the present disclosure.

FIG. 9A illustrates example COT sharing, across IAB nodes of an IAB network, of COT initiated for communications by a DU of an IAB node, according to aspects of the present disclosure. With reference to FIG. 9A, the DU of the IAB node 902 may acquire a COT 914 for a channel in a unlicensed 5G spectrum by performing a type 1 channel access procedure 912, which the DU, after transmitting a DL transmission 916, shares with the child IAB node 908 for the child IAB node's further transmission (e.g., DL transmission 922) to a third IAB node or UE 910 positioned along a downstream signal path away from the IAB donor. The COT 914 may have an associated maximum COT. In some aspects, the child IAB node's DL transmission 922 may be to a third IAB node positioned along an upstream signal path towards an IAB donor of the IAB network. The DL transmission 916 from the DU of the IAB node 902 may include a DCI transmission 918 (e.g., DCI2_0 message, DCI2-5 message) indicating to the IAB node 908 the type of channel access procedure (e.g., type 1 channel access procedure) to be performed to access the shared COT. The DCI transmission 918 may also include COT-related information, such as the COT remaining after the DL transmission 916 by the DU of the IAB node 902.

In some aspects, after receiving the DL transmission 916 which may include the DCI transmission 918, the child MT of the IAB node 908 may share the COT with the co-located DU of the same IAB node 908, which allows the co-located DU to access the COT by performing a type 2 channel access procedure 920. The DU of the IAB node 908 may perform a type 2 channel access procedure 920 (e.g., type 2A) to access the remaining COT 914 despite the indication from the DCI transmission 918 about performing type 1 channel access procedure, provided the conditions for the type 2 procedure are fulfilled by the shared (i.e., remaining) COT. The DU of the IAB node 908 may then transmit a DL transmission 922 to a UE or a third IAB node 910 that is different from the COT-initiating node 902 and can be along downstream signal path (i.e., away from the IAB donor of the IAB network). The DL transmission 922 may include a DCI transmission 924 (e.g., DCI2_0 message, DCI2_5 message) including information about the COT 914 remaining after the DL transmission 922 and about a type of channel access procedure the IAB node or UE 910 may perform to access this remaining COT. In some aspects, the MT of the IAB node 910 may perform a type 2 channel access procedure 926 to access the COT for an UL transmission 928 back to the parent IAB node 908. The MT of the IAB node 910 may perform the type 2 channel access procedure 926 (e.g., type 2A) to access the remaining COT despite the indication from the DCI transmission 924 about performing type 1 channel access procedure, provided the conditions for the type 2 procedure are fulfilled by the shared (i.e., remaining) COT. In FIG. 9A, the x-axis represents time in some arbitrary units.

In some aspects, the COT-initiating DU of the IAB node 902 may itself share with the co-located MT of the same IAB node 902 the COT 914, which allows the co-located MT to use the COT 914 to transmit an UL transmission 930 to the parent IAB node 904. In some aspects, the UL transmission 930 may include an UL signal 932 for the parent DU (i.e., the DU of the IAB node 904) having COT sharing information (e.g., COT available for sharing with the DU of the IAB node 904 after UL transmission 930), which may allow the parent DU to determine whether it can perform type 2 channel access procedure to access the COT. In some cases, the parent DU may not have this information otherwise (i.e., without receiving it via the UL signal 932 because the parent DU may not control the DU of the IAB node 902).

In some aspects, after receiving the UL transmission 930 which may include the UL signal 932, the parent DU of the IAB node 904 may share the COT with the co-located MT of the same IAB node 904, which allows the co-located MT to access the COT by performing a type 2 channel access procedure 934. The UL signal 932 may include information about the remaining COT and about a type of channel access procedure the IAB node 904 may perform to access this remaining COT. In some aspects, the MT of the IAB node 904 may perform a type 2 channel access procedure 934 (e.g., type 2A) to access the remaining COT despite the indication from the UL signal 932 about performing type 1 channel access procedure, provided the conditions for the type 2 procedure are fulfilled by the shared (i.e., remaining) COT. The MT of the IAB node 904 may then transmit an UL transmission 936 to a third IAB node 906 that is different from the COT-initiating node 902 and can be along upstream signal path (i.e., towards the IAB donor of the IAB network). The UL transmission 936 may also include a UL signal 938 that includes information about the COT 914 remaining after the UL transmission 930 and about a type of channel access procedure the IAB node 906 may perform to access this remaining COT for further transmission.

In some aspects, the example COT-sharing illustrated in FIG. 9A allows for a COT initiated for transmission by a DU of an IAB node 902 to be used for communication with, or to be shared with, IAB nodes (e.g., IAB nodes 906 and 910) that are not directly linked to the COT-initiating IAB node 902. That is, with the COT-sharing approach illustrated in FIG. 9A, a COT may be used by a neighboring IAB node (e.g., IAB nodes 904 and 908) to communicate with IAB nodes that are further away from, and not directly linked to, the COT-initiating IAB node 902. Further, the COT-sharing approach allows the COT to be shared with IAB nodes (e.g., IAB nodes 906 and 910) that are more than one backhaul or access link away from the COT-initiating IAB 902. By allowing a COT to be shared across IAB nodes of an IAB network as discussed herein, in some aspects, such COT-sharing approach improves efficiency of the use of IAB network resources.

FIG. 9B illustrates example COT sharing, across IAB nodes of an IAB network, of COT initiated for communications by a MT of an IAB node, according to aspects of the present disclosure. With reference to FIG. 9B, the MT of the IAB node 952 may acquire a COT 964 for a channel in a unlicensed 5G spectrum by performing a type 1 channel access procedure 962, which the MT, after transmitting an UL transmission 966, shares with the parent IAB node 954 for the parent IAB node's further transmission (e.g., UL transmission 972) to a third IAB node 956 positioned along an upstream signal path towards from the IAB donor of the IAB network. The COT 964 may have an associated maximum COT. In some aspects, the child IAB node's UL transmission 972 may be to a third IAB node positioned along an upstream signal path towards an IAB donor of the IAB network. The UL transmission 966 from the MT of the IAB node 952 may include an UL signal 968 having information about the type of channel access procedure performed by the MT prior to the UL transmission 966. The UL signal 968 may also include information related to COT sharing, for example, the amount of COT remaining after the transmission by the MT. In addition, the UL signal 968 may include a request from the MT to the parent DU (i.e., DU of the IAB node 954) for the parent DU to perform a specific type of channel access procedure in transmitting a DL transmission to the MT.

In some aspects, after receiving the UL transmission 966 which may include the UL signal 968, the parent DU (i.e., the DU of the IAB node 954) may share the COT with the co-located MT of the same IAB node 954, which allows the co-located MT to access the COT by performing a type 2 channel access procedure 970. In some aspects, the UL transmission 966 may include an UL signal 968 for the parent DU having COT sharing information (e.g., remaining COT available for sharing after UL transmission 966). Such information may be used in determining whether it can perform type 2 channel access procedure to access the COT. In some cases, the parent DU may not have this information otherwise (i.e., without receiving it via the UL signal 932 because the parent DU may not control the DU of the IAB node 902). The MT of the IAB node 954 may then transmit an UL transmission 972 to a third IAB node 956 that is different from the COT-initiating node 952 and can be along upstream signal path (i.e., towards the IAB donor of the IAB network). The UL transmission 972 may include an UL signal 974 including information about the COT 964 remaining after the UL transmission 972 and about a type of channel access procedure the IAB node 956 may perform to access this remaining COT.

In some aspects, besides sharing the COT with the co-located MT, the DU of COT-initiating IAB node 952 may transmit a DL transmission 976 that includes a DCI transmission 978 (e.g., DCI2_0 message, DCI2_5 message) indicating to the IAB node 958 the type of channel access procedure (e.g., type 1 channel access procedure) to be performed to access the shared COT. The DCI transmission 978 may also include COT-related information, such as the COT remaining after the DL transmission 976 by the DU of the IAB node 952. In some aspects, after receiving the DL transmission 976 which may include the DCI transmission 978, the child MT of the IAB node 958 may share the COT with the co-located DU of the same IAB node 958, which allows the co-located DU to access the COT by performing a type 2 channel access procedure 980. The co-located DU of the IAB node 958 may then perform a type 2 channel access procedure 920 (e.g., type 2A) to access the remaining COT 954 despite the indication from the DCI transmission 918 about performing type 1 channel access procedure, provided the conditions for the type 2 procedure are fulfilled by the shared (i.e., remaining) COT. The DU of the IAB node 908 may then transmit a DL transmission 982 to a UE or a third IAB node 960 that is different from the COT-initiating node 952 and can be positioned along downstream signal path (i.e., away from the IAB donor of the IAB network). The DL transmission 982 may include a DCI transmission 984 (e.g., DCI2_0 message, DCI2_5 message) including information about the COT 964 remaining after the DL transmission 982 and about a type of channel access procedure the IAB node or UE 960 may perform to access this remaining COT. In some aspects, the MT of the IAB node 960 may perform a type 2 channel access procedure 986 to access the COT for an UL transmission 988 back to the parent IAB node 958. The MT of the IAB node 960 may perform the type 2 channel access procedure 986 (e.g., type 2A) to access the remaining COT despite the indication from the DCI transmission 984 about performing type 1 channel access procedure, provided the conditions for the type 2 procedure are fulfilled by the shared (i.e., remaining) COT. In FIG. 9B, the x-axis represents time in some arbitrary units.

In some aspects, the example COT-sharing illustrated in FIG. 9B allows for a COT initiated for transmission by a MT of an IAB node 952 to be used for communication with, or to be shared with, IAB nodes (e.g., IAB nodes 956 and 960) that are not directly linked to the COT-initiating IAB node 952. That is, with the COT-sharing approach illustrated in FIG. 9B, a COT may be used by a neighboring IAB node (e.g., IAB nodes 954 and 958) to communicate with IAB nodes that are further away from, and not directly linked to, the COT-initiating IAB node 952. Further, the COT-sharing approach allows the COT to be shared with IAB nodes (e.g., IAB nodes 956 and 960) that are more than one backhaul or access links away from the COT-initiating IAB 902. By allowing a COT to be shared across IAB nodes of an IAB network as discussed herein, in some aspects, such COT-sharing approach improves efficiency of the use of IAB network resources.

Figure 10:
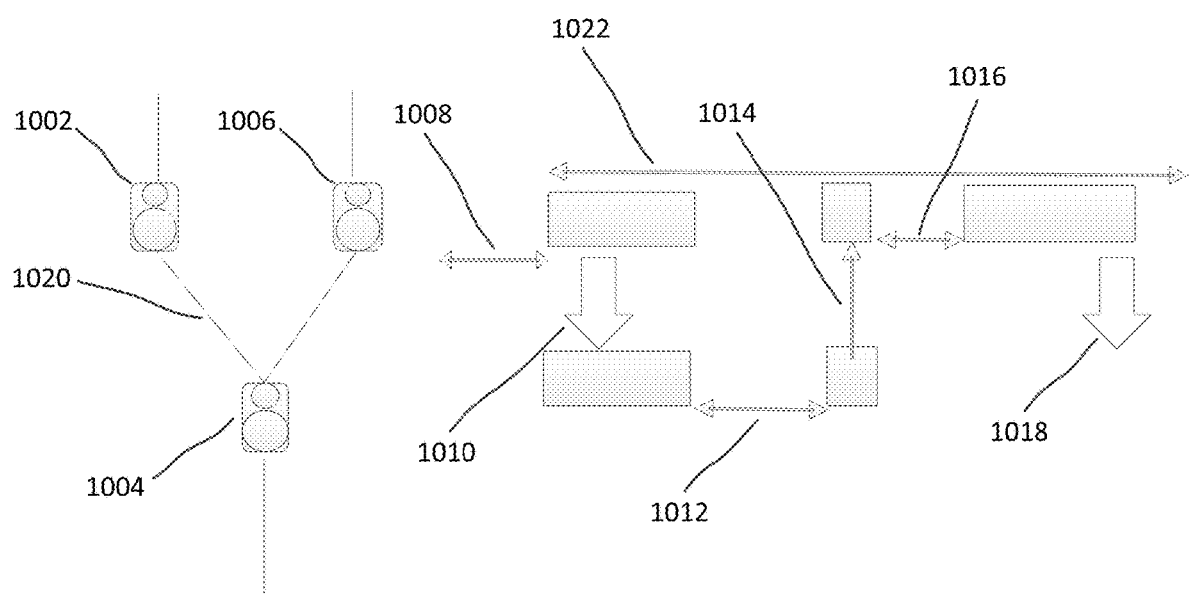
FIG. 10 illustrates example COT sharing across IAB nodes of an IAB network according to aspects of the present disclosure.

In some aspects, an IAB node that received a COT from a COT-initiating IAB node may share the COT with a third IAB node that may be positioned along the same upstream or downstream signal path from the IAB donor of the IAB network that includes the IAB nodes and the IAB donor. For example, in FIGS. 9A-9B, IAB node 904, after receiving a COT from COT-initiating IAB node 902, shares the COT with IAB node 906, which is positioned along the same signal path from or away the IAB donor as the COT-receiving IAB node 904. In some aspects, however, the COT-receiving IAB node may be positioned along the opposite signal path with respect to the IAB donor. For example, FIG. 10 shows a COT-initiating IAB node 1002 initiating or acquiring a COT 1022 for a DL transmission 1010 to child IAB node 1004 by performing a type 1 channel access procedure 1008 (e.g., substantially similar to IAB node 902 acquiring COT 914). The COT-initiating IAB node 1002 may share the COT 1022 with IAB node 1004, which the MT of the latter accesses by performing a type 2 channel access procedure 1012. The MT of the IAB node 1004 may transmit an UL signal 1014 to share the COT with a different parent IAB node 1006 that is different from the parent IAB node from which IAB node 1004 initially received the COT 1022. In other words, the child IAB node 1004 may share the COT 1022 with an IAB node 1006 that is positioned, with respect to the child IAB node 1004, along a signal path (e.g., upstream towards or downstream away from the IAB donor of the IAB network) that is opposite to the signal path of the child IAB node with respect to the COT-initiating IAB node 1002. The UL signal 1014 may include a request from the MT of IAB node 1004 to the parent DU (i.e., DU of the parent IAB node 1006) for the parent DU to perform a specific type of channel access procedure in transmission a DL transmission to the MT. The IAB node 1006 may then perform, for example based on the request in the UL signal 1014, a type 2 channel access procedure 1016 to access the COT 1022 for further transmission (e.g., such as DL transmission 1018 back to IAB node 1004 or another IAB node linked to it by a backhaul or access link).

In some aspects, the sharing of COT across IAB nodes of an IAB network as discussed, for example, with respect to FIGS. 9A-9B and FIG. 10, may have associated constraints. For example, the sharing may be restricted to IAB nodes (or UEs) that are no farther than a given number of backhaul or access links from the COT-initiating IAB node. For instance, if the maximum number of links from the COT-initiating IAB node ("max hop count") is set at one, then a COT-receiving IAB node can only use the COT for communication back to the COT-initiating IAB node. In some aspects, the max hop count can be 1, 2, 3, 4, 5, etc. In some aspects, the COT-sharing may be permitted along one signal path direction but not along the opposite direction. For instance, COT-sharing may be allowed if the COT-receiving IAB node is positioned along an upstream or downstream signal path towards the IAB donor of the IAB network but not if the COT-receiving IAB node is positioned along the downstream or upstream signal path, respectively. In some aspects, the COT-sharing along a particular signal path direction (e.g., upstream or downstream) may be allowed if the COT is initiated for transmission by the DU of the COT-initiating IAB node, but not if the COT is initiated for transmission by the MT of the COT-initiating IAB node, or vice versa. For example, a COT-initiating or receiving IAB node may be allowed to share a COT with an IAB node downstream from the IAB donor of the IAB network only if the COT was initiated or acquired by the COT-initiating IAB node for transmission by the DU (but not by the MT) or by the MT (but not by the DU) of the COT-initiating IAB node. In some aspects, the COT-sharing may be independent of the positioning of the COT-receiving IAB node with respect to the IAB node sharing the COT (i.e., independent of whether COT-receiving IAB node is upstream or downstream).

In some aspects, the COT-sharing may depend on the resource types of the IAB nodes participating in the COT-sharing. For example, the COT-sharing may be allowed or prohibited based on the resource types of the IAB nodes (e.g., the DU resource types), such resources types including but not limited to hard, soft (available or non-available), not available, configured for uplink transmission, configured for downlink transmission, flexible, full-duplex capable, etc. For instance, an IAB node may share a COT with another IAB node based on whether the other IAB node has hard resource type but not if it has soft resource type, etc., or vice versa. This example is for illustration purpose and the COT-sharing may depend on any of the resource types.

In some aspects, COT sharing by a first IAB node with a second IAB node of an IAB network may depend on the transmission power and/or transmission beam direction of the second IAB node. That is, the sharing of COT between two IAB nodes of an IAB network may be constrained by the transmission power and/or transmission beam direction of the IAB node that is receiving the COT. For example, the first IAB node may share COT with the second IAB node when (e.g., in some cases, only when) the second IAB node has a transmission power that is no greater than a threshold transmission power. As another example, the constraint may be that the first IAB node, i.e., the sharer of the COT, may share the COT with the second IAB node when (e.g., in some cases, only when) the transmission beam used by the second IAB node is selected from a specific subset of beams, or within a specific angular range of the beam used by the first IAB node. In some aspects, constraints may be indicated (e.g., to the second IAB node) by the first IAB node using MAC-CE messages and/or DL/UL control indications.

In some aspects, a parent IAB node or the CU of an IAB donor (of the IAB network which the IAB node is a part of) may control the afore-mentioned constraints of COT-sharing across IAB nodes of the IAB network. For example, the control unit (CU) of the IAB may configure (e.g., semi-statically) the COT-sharing by using F1 application protocol (AP) messages via F1 interface connecting the CU to the DU of the same IAB donor. In other words, the CU may communicate with the IAB nodes via the DU to configure the IAB nodes with the constraints on sharing COT. In some aspects, in addition to or instead of using F1-AP messages, the CU may use RRC messages to configure the IAB nodes about COT-sharing. In some aspects, a parent IAB node may configure a child IAB node to switch between channel access procedure types. For example, a parent DU (i.e., the DU of a parent IAB node) may configure child IAB nodes via a MAC control element (MAC CE) and/or a DCI message on PDCCH, and/or via a UCI message on PUCCH and/or PUSCH.

In some aspects, a parent IAB node may provide or indicate COT-sharing information such as amount of remaining COT to a child IAB node (i.e., IAB node that is downstream from the parent IAB node) via a DCI communication (e.g., DCI transmissions 918, 924, 978 and 984). For example, such DCI transmissions can be in the form of DCI2_0 messages and may include information about the remaining COT from a parent IAB node to a child IAB node. In some aspects, the DCI transmissions can be in the form of DCI2_5 messages. Such messages may include COT-sharing information explicitly or implicitly, such information including the availability of COT, the availability of soft IAB node resources (i.e., whether a soft resource is available or non-available), etc.). In some aspects, the DCI transmission may include COT sharing information not only about the IAB node that shared the COT but did not initiate the COT, but also about the IAB-node that initiated the COT. For example, with reference to FIG. 9B, DCI transmission 984 may include COT-sharing information related to not only IAB node 958 sharing the COT with IAB node 960, but about IAB node 952 that initiated the COT.

In some aspects, COT-sharing information from a child IAB node to a parent IAB node may be indicated or provided via UL signals (e.g., UL signals 932, 938, 962, 974 and 1014). In some cases, the parent IAB node may not have this information otherwise (i.e., without receiving it via the UL signal) because, for example, the parent IAB node may not control the DU of the child IAB node. With respect to COT sharing between a BS and a UE, in some cases, the COT-sharing information may be carried only by CG-UCI in case of UL transmission as a result of a configured grant. For a UL transmission, as a result of a dynamic scheduled grant, no UL signal may be needed to carry COT-sharing information for access network, because in this case the UL transmission may be scheduled/controlled by the BS, which may already possess the COT-sharing information. But COT sharing between across an IAB-network may be different, because the COT may be initiated by an IAB-node DU and then be shared to a parent node DU via an IAB-node MT, and in this case the COT sharing information may be unknown to parent DU for dynamic scheduled UL transmission because parent DU may not control IAB-node DU's activity. Thus, for IAB-node network, the COT sharing information may need to be supported by an UL signal even for dynamic scheduled UL transmission.

In some aspects, an IAB node that receives a COT along with a UL signal may update the received UL signal before further sharing the COT with a parent IAB node (and transmitting the updated UL signal to the parent IAB node). For example, with respect to FIG. 9A, the IAB node 904 may generate the UL signal 938 by updating the UL signal 932, for example, by updating the UL signal 932 with additional information about the availability of COT (e.g., after usage of the COT for UL transmission 930) or resource types of IAB nodes.

As noted above, in some aspects, the UL signals (such as UL signals 932, 938, 962, 974 and 1014, etc.) from the child MT of a child IAB node to a parent DU of a parent IAB node may include information related to the COT, such as but not limited to amount of remaining COT. In some cases, the child IAB node may have initiated the COT, and in other cases, the child IAB node may have received the COT from another IAB node (or from the COT-initiating IAB node). In such cases, the UL signals may include COT-sharing information not only about the IAB node that shared the COT but did not initiate the COT but also about the IAB node that initiated the COT. The UL signals may also include information related to a channel access procedure performed by the MT of the COT-sharing IAB node, e.g., the switch from type 1 channel access procedure to type 2 channel access procedure performed by the MT to acquire the COT. Further, the UL signals may include a request from the MT to the parent DU for the parent DU to perform a specific type of channel access procedure in transmission a DL transmission to the MT. In some aspects, the UL signal may be carried on a UCI on PUCCH, a UCI on PUSCH or a MAC CE.

Figure 11:
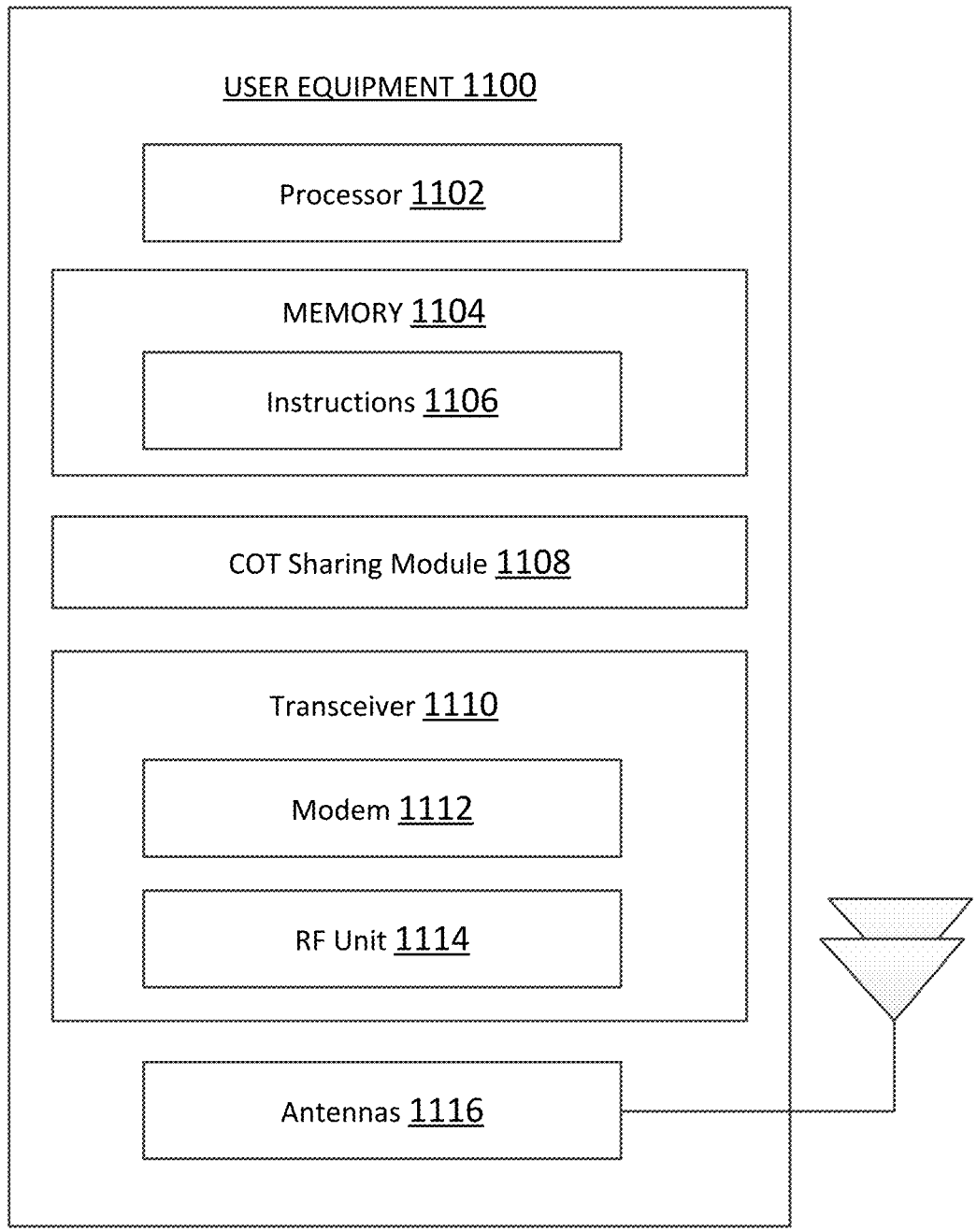
FIG. 11 is a block diagram of an example UE according to aspects of the present disclosure.

FIG. 11 is a block diagram of an exemplary UE 1100 according to aspects of the present disclosure. The UE 1100 may be a UE 115 in the network 100, the network 200, the network 300 or the network 400 as discussed above in FIG. 1, 2, 3 or 4A, respectively. The UE 1100 can also be UE 475 in the IAB network 450, as discussed above in FIG. 4B. As shown, the UE 1100 may include a processor 1102, a memory 1104, a COT sharing module 1108, a channel access module 1109, a transceiver 1110 including a modem subsystem 1112 and a radio frequency (RF) unit 1114, and one or more antennas 1116. These elements may be in direct or indirect communication with each other, for example via one or more buses.

The processor 1302 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 1102 may also be implemented as a combination of computing devices, e.g., a combination of a DSP and a microprocessor, a plurality of microprocessors, one or more microprocessors in conjunction with a DSP core, or any other such configuration.

The memory 1104 may include a cache memory (e.g., a cache memory of the processor 1102), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an aspect, the memory 1304 includes a non-transitory computer-readable medium. The memory 1104 may store, or have recorded thereon, instructions 1106. The instructions 1106 may include instructions that, when executed by the processor 1102, cause the processor 1102 to perform the operations described herein with reference to the UEs 115 in connection with aspects of the present disclosure, for example, aspects of FIGS. 1-10 and 13. Instructions 1106 may also be referred to as program code. The program code may be for causing a wireless communication device to perform these operations, for example by causing one or more processors (such as processor 1102) to control or command the wireless communication device to do so. The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may include a single computer-readable statement or many computer-readable statements.

The COT sharing module 1108 may be implemented via hardware, software, or combinations thereof. For example, the COT sharing module 1108 may be implemented as a processor, circuit, and/or instructions 1106 stored in the memory 1104 and executed by the processor 1102. The COT sharing module 1108 may be used for various aspects of the present disclosure, including aspects of FIGS. 1-10 and 13. For example, the COT sharing module 1108 is configured to perform channel access procedures (e.g., as discussed with reference to FIGS. 7A-7E) to allow the UE 1100 to access COT shared by its parent IAB node, as discussed in the aspects of FIGS. 1-10 and 13.

As shown, the transceiver 1110 may include the modem subsystem 1112 and the RF unit 1114. The transceiver 1110 can be configured to communicate bi-directionally with other devices, such as the BSs 105. The modem subsystem 1112 may be configured to modulate and/or encode the data from the memory 1104, the channel access module 1109, and/or the COT sharing module 1108, according to a modulation and coding scheme (MCS), e.g., a low-density parity check (LDPC) coding scheme, a turbo coding scheme, a convolutional coding scheme, a digital beamforming scheme, etc. The RF unit 1114 may be configured to process (e.g., perform analog to digital conversion or digital to analog conversion, etc.) modulated/encoded data from the modem subsystem 1112 (on outbound transmissions) or of transmissions originating from another source such as a UE 115 or a BS 105. The RF unit 1114 may be further configured to perform analog beamforming in conjunction with the digital beamforming. Although shown as integrated together in transceiver 1110, the modem subsystem 1112 and the RF unit 1114 may be separate devices that are coupled together at the UE 115 to enable the UE 115 to communicate with other devices.

The RF unit 1114 may provide the modulated and/or processed data, e.g. data packets (or, more generally, data messages that may contain one or more data packets and other information), to the antennas 1316 for transmission to one or more other devices. The antennas 1116 may further receive data messages transmitted from other devices. The antennas 1116 may provide the received data messages for processing and/or demodulation at the transceiver 1110. The antennas 1116 may include multiple antennas of similar or different designs in order to sustain multiple transmission links. The RF unit 1114 may configure the antennas 1116.

In an aspect, the UE 1100 can include multiple transceivers 1110 implementing different RATs (e.g., NR and LTE). In an aspect, the UE 1100 can include a single transceiver 1110 implementing multiple RATs (e.g., NR and LTE). In an aspect, the transceiver 1110 can include various components, where different combinations of components can implement RATs.

Figure 12:
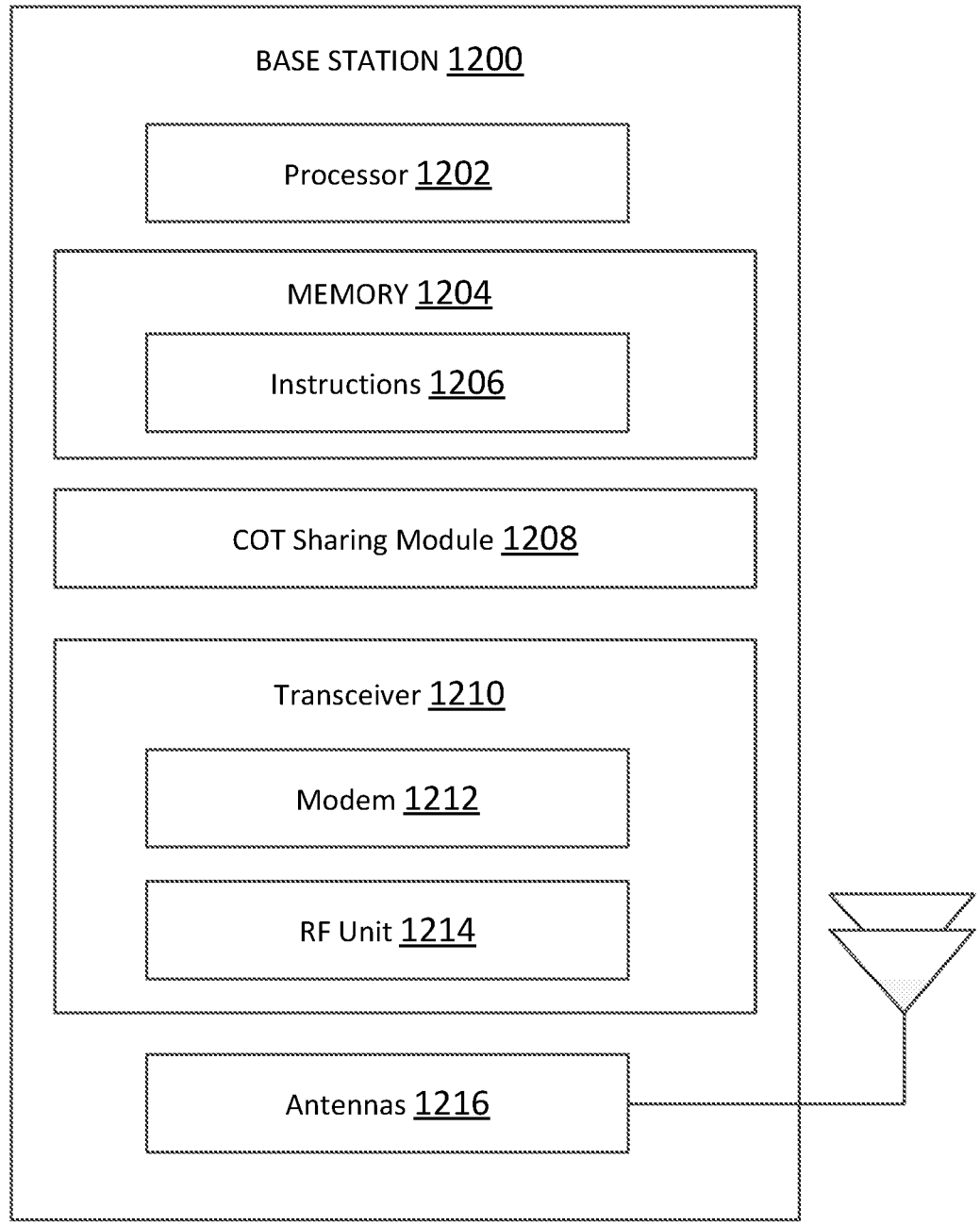
FIG. 12 is a block diagram of an example base station (BS) according to aspects of the present disclosure.

FIG. 12 is a block diagram of an exemplary BS 1400 according to aspects of the present disclosure. The BS 1200 may be a BS 105 in the networks 100, 200, 300 or 400 as discussed above in FIG. 1, 2 3, or 4A, respectively. The BS 1200 can be the IAB donor 410 or the IAB node 105 of the IAB network 400 of FIG. 4A. The BS 1200 can also be the IAB donor 455 or the IAB nodes 465 or 466 of the IAB network 450 of FIG. 4B. As shown, the BS 1200 may include a processor 1202, a memory 1204, a COT sharing module 1208, a transceiver 1210 including a modem subsystem 1212 and a RF unit 1214, and one or more antennas 1216. These elements may be in direct or indirect communication with each other, for example via one or more buses.

The processor 1202 may have various features as a specific-type processor. For example, these may include a CPU, a DSP, an ASIC, a controller, a FPGA device, another hardware device, a firmware device, or any combination thereof configured to perform the operations described herein. The processor 1202 may also be implemented as a combination of computing devices, e.g., a combination of a DSP and a microprocessor, a plurality of microprocessors, one or more microprocessors in conjunction with a DSP core, or any other such configuration.

The memory 1204 may include a cache memory (e.g., a cache memory of the processor 1202), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some aspects, the memory 1204 may include a non-transitory computer-readable medium. The memory 1404 may store instructions 1206. The instructions 1206 may include instructions that, when executed by the processor 1202, cause the processor 1202 to perform operations described herein, for example, aspects of FIGS. 1-10 and 13. Instructions 1206 may also be referred to as code, which may be interpreted broadly to include any type of computer-readable statement(s) as discussed above with respect to FIG. 11.

The COT sharing module 1208 may be implemented via hardware, software, or combinations thereof. For example, the COT sharing module 1208 may be implemented as a processor, circuit, and/or instructions 1206 stored in the memory 1204 and executed by the processor 1202. The COT sharing module 1208 may be used for various aspects of the present disclosure, aspects of FIGS. 1-10 and 13. For example, the COT sharing module 1208 is configured to receive, from a second IAB node and for signal transmission by the first IAB node, a first communication signal allowing the first IAB node to access a channel in an unlicensed 5G spectrum during a channel occupancy time (COT). In such instances, the COT may be acquired by the second IAB node. The COT sharing module 1208 may also be configured to communicate a second communication signal with a third IAB node different from the first IAB node to allow the third IAB node to access the channel for signal transmission by the third IAB node during the COT.

In some aspects, the COT can be shared with the first IAB node for signal transmission by a mobile terminal (MT) of the first IAB node; and the third IAB node may be positioned along an upstream signal path from the second IAB node towards an IAB donor of an IAB network that includes the IAB donor, the first IAB node, the second IAB node and the third IAB node the first channel access procedure is a type 1 channel access procedure. In some aspects, the COT can be shared with the first IAB node for signal transmission by a distributed unit (DU) of the first IAB node; and the third IAB node may be positioned along a downstream signal path from the second IAB node towards an IAB donor of an IAB network that includes the IAB donor, the first IAB node, the second IAB node and the third IAB node.

In some aspects, the second IAB node may perform a type 2 channel access procedure to access the COT prior to transmitting the first communication signal during the COT. In some aspects, the third IAB node can perform a type 2 channel access procedure signal to access the COT prior to transmitting the transmission by the third IAB node during the COT. In some aspects, the method further comprises receiving a dynamic indication from the second IAB node permitting the first IAB node to allow the third IAB node to access the channel for signal transmission by the third IAB node during the COT.

In some aspects, the communicating the second communication signal with the third IAB node can be based on a semi-static configuration established by an IAB donor of an IAB network including the first IAB node, the second IAB node and the third IAB node. In some aspects, the first communication signal may include an uplink (UL) communication signal from a mobile terminal (MT) of the second IAB node to a parent distributed unit (DU) of the first IAB node. In some aspects, the second communication signal may include an uplink (UL) communication signal from a mobile terminal (MT) of the first IAB node to a parent distributed unit (DU) of the third IAB node. In some aspects, the UL communication signal includes channel access information related to a switch from a type 1 channel access procedure to a type 2 channel access procedure performed by the MT prior to communicating the second communication signal.

In some aspects, the UL communication signal includes COT sharing information related to sharing of the COT. In some aspects, the UL communication signal includes a request indicating a channel access procedure to be performed by the parent DU for incoming signal transmission. In some aspects, the UL communication signal is transmitted as an uplink control information (UCI) message via a physical uplink control channel (PUCCH). In some aspects, the UL communication signal is transmitted as an uplink control information (UCI) message via a physical uplink shared channel (PUSCH). In some aspects, the UL communication signal is transmitted as medium access control (MAC) control element (CE) message.

In some aspects, the first communication signal includes a downlink (DL) communication signal from a parent distributed unit (DU) of the second IAB node to a mobile terminal (MT) of the first IAB node. In some aspects, the second communication signal includes a downlink (DL) communication signal from a parent distributed unit (DU) of the first IAB node to a mobile terminal (MT) of the third IAB node. In some aspects, the DL communication signal includes COT-sharing information related to sharing of the COT. In some aspects, the DL communication signal is transmitted as a downlink control information (DCI) message including a DCI2_0 message and/or a DCI2_5 message. In some aspects, the DL communication signal is a DL transmission scheduled via a downlink control information (DCI) grant. In some aspects, the DL communication signal is transmitted as medium access control (MAC) control element (CE) message. In some aspects, a number of backhaul links between the second IAB node and the third IAB nodes is no greater than a maximum hop count constraint on sharing COT in the IAB network. Mechanisms for sharing a COT acquired for a scheduled communication (TX/RX) by a first IAB node across IAB nodes of the same IAB network are described in greater detail herein.

As shown, the transceiver 1210 may include the modem subsystem 1212 and the RF unit 1214. The transceiver 1210 can be configured to communicate bi-directionally with other devices, such as the UEs 115 and/or another core network element. The modem subsystem 1212 may be configured to modulate and/or encode data according to a MCS, e.g., a LDPC coding scheme, a turbo coding scheme, a convolutional coding scheme, a digital beamforming scheme, etc. The RF unit 1214 may be configured to process (e.g., perform analog to digital conversion or digital to analog conversion, etc.) modulated/encoded data from the modem subsystem 1212 (on outbound transmissions) or of transmissions originating from another source such as a UE 115. The RF unit 1214 may be further configured to perform analog beamforming in conjunction with the digital beamforming. Although shown as integrated together in transceiver 1210, the modem subsystem 1212 and/or the RF unit 1214 may be separate devices that are coupled together at the BS 105 to enable the BS 105 to communicate with other devices.

The RF unit 1214 may provide the modulated and/or processed data, e.g. data packets (or, more generally, data messages that may contain one or more data packets and other information), to the antennas 1216 for transmission to one or more other devices. This may include, for example, transmission of information to complete attachment to a network and communication with a camped UE 115 according to aspects of the present disclosure. The antennas 1216 may further receive data messages transmitted from other devices and provide the received data messages for processing and/or demodulation at the transceiver 1210. The antennas 1216 may include multiple antennas of similar or different designs in order to sustain multiple transmission links.

In an aspect, the BS 1200 can include multiple transceivers 1210 implementing different RATs (e.g., NR and LTE). In an aspect, the BS 1200 can include a single transceiver 1210 implementing multiple RATs (e.g., NR and LTE). In an aspect, the transceiver 1210 can include various components, where different combinations of components can implement RATs.

In some aspects, the transceiver 1210 may be configured to receiving, from a second IAB node and for signal transmission by the first IAB node, a first communication signal allowing the first IAB node to access a channel in an unlicensed 5G spectrum during a channel occupancy time (COT). The COT may be acquired by the second IAB node.

In some aspects, the transceiver 1210 may be configured to communicate a second communication signal with a third IAB node different from the first IAB node to allow the third IAB node to access the channel for signal transmission by the third IAB node during the COT.

Figure 13:
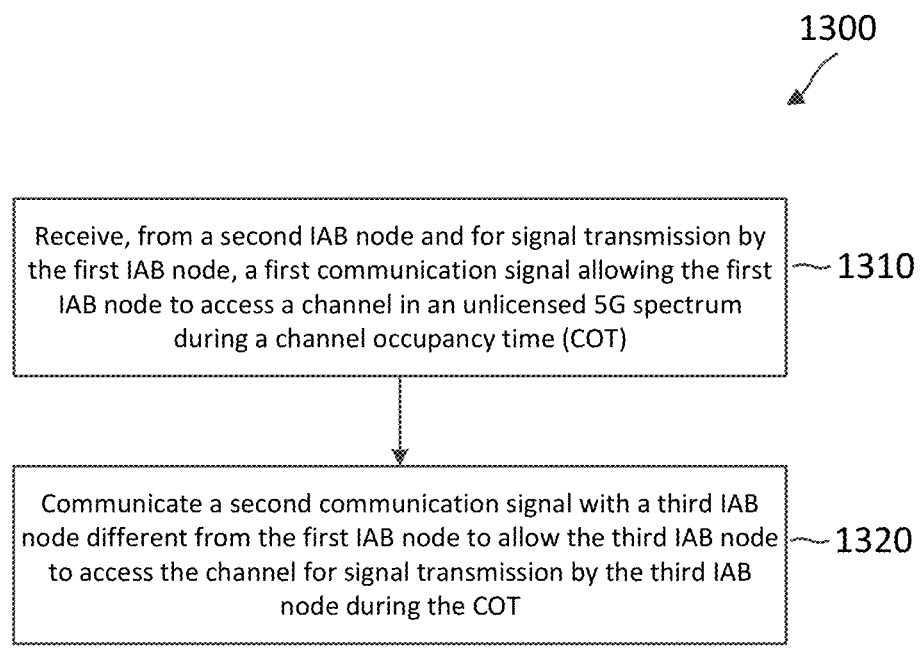
FIG. 13 is a flow diagram of a method for sharing COT between IAB nodes in a baseline approach according to aspects of the present disclosure.

FIG. 13 is a flow diagram of a method for sharing COT across IAB nodes of an IAB network according to aspects of the present disclosure. The IAB network may be similar to the networks 100, 200, 300, 400 or 450 and may be configured with the topology 400 and/or 450. Steps of the method 1300 can be executed by a computing device (e.g., a processor, processing circuit, and/or other suitable component) of a wireless communication device, such as the IAB nodes of the IAB network (e.g., the BSs or IAB node 105, 465 or 466, the IAB donor 410 or 455, etc.) and UEs (e.g., the UEs 115 or 475). As illustrated, the method 1300 includes a number of enumerated steps, but aspects of the method 1300 may include additional steps before, after, and in between the enumerated steps. In some aspects, one or more of the enumerated steps may be omitted or performed in a different order.

At block 1310, the method 1300 includes a first integrated access backhaul (IAB) node receiving, from a second IAB node and for signal transmission by the first IAB node, a first communication signal allowing the first IAB node to access a channel in an unlicensed 5G spectrum during a channel occupancy time (COT). In such instances, the COT may be acquired by the second IAB node.

In some instances, the first IAB node may utilize one or more components, such as the processor 1302, the memory 1304, the COT sharing module 1308, the transceiver 1310, the modem 1312, and/or the one or more antennas 1316, to receive, from a second IAB node and for signal transmission by the first IAB node, a first communication signal allowing the first IAB node to access a channel in an unlicensed 5G spectrum during a channel occupancy time (COT). In such instances, the COT may be acquired by the second IAB node.

At block 1320, the method 1300 includes the first IAB communicating a second communication signal with a third IAB node different from the first IAB node to allow the third IAB node to access the channel for signal transmission by the third IAB node during the COT.

In some instances, the first IAB node may utilize one or more components, such as the processor 1302, the memory 1304, the COT sharing module 1308, the transceiver 1310, the modem 1312, and/or the one or more antennas 1316, to communicating a second communication signal with a third IAB node different from the first IAB node to allow the third IAB node to access the channel for signal transmission by the third IAB node during the COT.

Some aspects of the present disclosure disclose a method of wireless communication performed by a first integrated access backhaul (IAB) node. The method comprises performing a first channel access procedure to reserve a channel occupancy time (COT) for a channel in an unlicensed 5G spectrum for signal transmission by the first IAB node. The method also comprises communicating with a second IAB node to allow the second IAB node to (i) access the channel for signal transmission by the second IAB node during the COT; and (ii) further allow a third IAB node to access the channel for signal transmission by the third IAB node during the COT.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method of wireless communication performed by a first integrated access backhaul (IAB) node, the method comprising:
   receiving, from a second IAB node and for signal transmission by the first IAB node, a first uplink communication signal allowing the first IAB node to access a channel in an unlicensed 5G spectrum during a channel occupancy time (COT), the COT acquired by the second IAB node, and the first IAB node being a parent node to the second IAB node, wherein the first uplink communication signal is received in a first portion of the COT;
   performing, by a mobile terminal (MT) of the first IAB node, a channel access procedure to communicate in a second portion of the COT; and
   transmitting, in the second portion of the COT after the first portion, a second uplink communication signal to a third IAB node to allow the third IAB node to access the channel for communications with one or more user equipment (UE) devices in a third portion of the COT after the second portion of the COT, the third IAB node being a parent node to the first IAB node;
   wherein the second uplink communication signal comprises information about a remaining amount of the COT and a type of channel access procedure the third IAB node is allowed to perform to access the third portion of the COT.

2. The method of claim 1, wherein:
   the COT is shared with the first IAB node for signal transmission by a mobile terminal (MT) of the first IAB node; and
   the third IAB node is positioned along an upstream signal path from the second IAB node towards an IAB donor of an IAB network that includes the IAB donor, the first IAB node, the second IAB node and the third IAB node.

3. The method of claim 1, wherein:
   the COT is shared with the first IAB node for signal transmission by a distributed unit (DU) of the first IAB node; and
   the third IAB node is positioned along a downstream signal path from the second IAB node towards an IAB donor of an IAB network that includes the IAB donor, the first IAB node, the second IAB node and the third IAB node.

4. The method of claim 1, wherein the second IAB node performs a type 2 channel access procedure to access the COT prior to transmitting the first uplink communication signal during the COT.

5. The method of claim 1, wherein the third IAB node performs a type 2 channel access procedure to access the COT prior to transmitting the transmission by the third IAB node during the COT.

6. The method of claim 1, further comprising receiving a dynamic indication from the second IAB node permitting the first IAB node to allow the third IAB node to access the channel for signal transmission by the third IAB node during the COT.

7. The method of claim 1, wherein the communicating the second uplink communication signal with the third IAB node is based on a semi-static configuration established by an IAB donor of an IAB network including the first IAB node, the second IAB node and the third IAB node.

8. The method of claim 1, wherein a number of backhaul links between the second IAB node and the third IAB nodes is no greater than a maximum hop count constraint on sharing COT in the IAB network.

9. A first integrated access backhaul (IAB) node, comprising:
a transceiver; and
a processor in communication with the transceiver, wherein the first IAB node is configured to:
receive, from a second IAB node and for signal transmission by the first IAB node, a first uplink communication signal allowing the first IAB node to access a channel in an unlicensed 5G spectrum during a channel occupancy time (COT), the COT acquired by the second IAB node, and the first IAB node being a parent node to the second IAB node, wherein the first uplink communication signal is received in a first portion of the COT;
perform, by a mobile terminal (MT) of the first IAB node, a channel access procedure to communicate in a second portion of the COT; and
transmit, in the second portion of the COT after the first portion, a second uplink communication signal to a third IAB node to allow the third IAB node to access the channel for communications with one or more user equipment (UE) devices in a third portion of the COT after the second portion of the COT, the third IAB node being a parent node to the first IAB node;
wherein the second uplink communication signal comprises information about a remaining amount of the COT and a type of channel access procedure the third IAB node is allowed to perform to access the third portion of the COT.

10. The apparatus of claim 9, wherein the first uplink communication signal is received from a mobile terminal (MT) of the second IAB node to a parent distributed unit (DU) of the first IAB node.

11. The apparatus of claim 9, wherein the second uplink communication signal is transmitted by the MT of the second IAB node to a parent distributed unit (DU) of the third IAB node.

12. The apparatus of claim 10, wherein the second uplink communication signal includes channel access information related to a switch from a type 1 channel access procedure to a type 2 channel access procedure performed by the MT prior to communicating the second uplink communication signal.

13. The apparatus of claim 10, wherein the second uplink communication signal includes COT sharing information related to sharing of the COT.

14. The apparatus of claim 10, wherein the second uplink communication signal includes a request indicating a channel access procedure to be performed by the parent DU for incoming signal transmission.

15. The apparatus of claim 10, wherein the second uplink communication signal is transmitted as an uplink control information (UCI) message via a physical uplink control channel (PUCCH).

16. The apparatus of claim 10, wherein the second uplink communication signal is transmitted as an uplink control information (UCI) message via a physical uplink shared channel (PUSCH).

17. The apparatus of claim 10, wherein the second uplink communication signal is transmitted as medium access control (MAC) control element (CE) message.

18. A non-transitory computer-readable medium (CRM) having program code recorded thereon, wherein the program code comprises instructions executable by a processor of a first integrated access backhaul (IAB) node to cause the first IAB node to:
receive, from a second IAB node and for signal transmission by the first IAB node, a first uplink communication signal allowing the first IAB node to access a channel in an unlicensed 5G spectrum during a channel occupancy time (COT), the COT acquired by the second IAB node, and the first IAB node being a parent node to the second IAB node, wherein the first uplink communication signal is received in a first portion of the COT;
perform, by a mobile terminal (MT) of the first IAB node, a channel access procedure to communicate in a second portion of the COT; and
transmit, in the second portion of the COT after the first portion, a second uplink communication signal to a third IAB node to allow the third IAB node to access the channel for communications with one or more user equipment (UE) devices in a third portion of the COT after the second portion of the COT, the third IAB node being a parent node to the first IAB node;
wherein the second uplink communication signal comprises information about a remaining amount of the COT and a type of channel access procedure the third IAB node is allowed to perform to access the third portion of the COT.

19. The non-transitory CRM of claim 18, wherein the second uplink communication signal includes COT-sharing information related to sharing of the COT.

20. The non-transitory CRM of claim 18, wherein the second uplink communication signal is transmitted as an uplink control information (UCI) message.

21. The non-transitory CRM of claim 18, wherein the second uplink communication signal is transmitted as medium access control (MAC) control element (CE) message.

22. A first integrated access backhaul (IAB) node, comprising:
means for receiving, from a second IAB node and for signal transmission by the first IAB node, a first uplink communication signal allowing the first IAB node to access a channel in an unlicensed 5G spectrum during a channel occupancy time (COT), the COT acquired by the second IAB node, and the first IAB node being a parent node to the second IAB node, wherein the means for receiving the first uplink communication signal comprises means for receiving the first uplink communication signal in a first portion of the COT;

means for performing, by a mobile terminal (MT) of the first IAB node, a channel access procedure to communicate in a second portion of the COT; and means for transmitting, in the second portion of the COT after the first portion, a second uplink communication signal with a third IAB node to allow the third IAB node to access the channel for communications with one or more user equipment (UE) devices in a third portion of the COT after the second portion of the COT, the third IAB node being a parent to the first IAB node;

wherein the second uplink communication signal comprises information about a remaining amount of the COT and a type of channel access procedure the third IAB node is allowed to perform to access the third portion of the COT.

23. The apparatus of claim 22, wherein:

the COT is shared with the first IAB node for signal transmission by a mobile terminal (MT) of the first IAB node; and the third IAB node is positioned along an upstream signal path from the second IAB node towards an IAB donor of an IAB network that includes the IAB donor, the first IAB node, the second IAB node and the third IAB node.

24. The apparatus of claim 22, wherein:

the COT is shared with the first IAB node for signal transmission by a distributed unit (DU) of the first IAB node; and the third IAB node is positioned along a downstream signal path from the second IAB node towards an IAB donor of an IAB network that includes the IAB donor, the first IAB node, the second IAB node and the third IAB node.

25. The apparatus of claim 22, wherein:

the first uplink communication signal is received from a mobile terminal (MT) of the second IAB node to a parent distributed unit (DU) of the first IAB node; or the second uplink communication signal includes an uplink (UL) communication signal from a mobile terminal (MT) of the first IAB node to a parent distributed unit (DU) of the third IAB node.

26. The apparatus of claim 22, wherein a number of backhaul links between the second IAB node and the third IAB nodes is no greater than a maximum hop count constraint on sharing COT in the IAB network.

* * * * *